(12) United States Patent
Vimalchand et al.

(10) Patent No.: US 7,771,585 B2
(45) Date of Patent: Aug. 10, 2010

(54) METHOD AND APPARATUS FOR THE SEPARATION OF A GAS-SOLIDS MIXTURE IN A CIRCULATING FLUIDIZED BED REACTOR

(75) Inventors: Pannalal Vimalchand, Birmingham, AL (US); Guohai Liu, Birmingham, AL (US); WanWang Peng, Birmingham, AL (US)

(73) Assignee: Southern Company, Birmingham, AL (US)

(*) Notice: Subject to any disclaimer, the term of this patent is extended or adjusted under 35 U.S.C. 154(b) by 811 days.

(21) Appl. No.: 11/684,405

(22) Filed: Mar. 9, 2007

(65) Prior Publication Data

US 2008/0216655 A1    Sep. 11, 2008

(51) Int. Cl.
*B01D 45/12* (2006.01)
*B01D 50/00* (2006.01)
*C10G 11/00* (2006.01)

(52) U.S. Cl. .............. 208/113; 55/337; 55/459.1; 55/466; 55/435; 55/338; 55/349; 55/345; 95/269; 95/271; 96/188; 96/372; 96/378; 208/89; 208/150; 208/161

(58) Field of Classification Search .............. 55/337, 55/459.1, 466, 435, 338, 349, 345; 95/269, 95/271; 96/188, 372, 378; 208/89, 113, 208/150, 161
See application file for complete search history.

(56) References Cited

U.S. PATENT DOCUMENTS

| | | | |
|---|---|---|---|
| 2,834,665 A | 5/1958 | Rudolph et al. | |
| 3,514,866 A | 6/1970 | McManus | 34/9 |
| 4,397,731 A | 8/1983 | Warzel | 208/8 LE |
| 4,713,096 A * | 12/1987 | Kajihara | 55/459.1 |
| 4,731,937 A | 3/1988 | Premel et al. | 34/20 |
| 4,790,251 A | 12/1988 | Vidt | 110/165 |
| 4,860,669 A | 8/1989 | Collins, Jr. et al. | 110/165 |
| 4,901,625 A | 2/1990 | Pressnall et al. | 110/259 |
| 4,909,163 A | 3/1990 | Hjalmarsson | 110/266 |
| 5,093,085 A | 3/1992 | Engstrom et al. | 422/143 |
| 5,095,854 A | 3/1992 | Dietz | 122/4 |
| 5,146,856 A | 9/1992 | George | 110/171 |
| 5,176,089 A | 1/1993 | Jonsson | 110/245 |
| 5,269,263 A | 12/1993 | Garcia-Mallol | 122/4 |
| 5,309,848 A | 5/1994 | Santelmann et al. | 110/171 |

(Continued)

FOREIGN PATENT DOCUMENTS

EP    0 855 366 B1    5/2001

OTHER PUBLICATIONS

Hugi and Reh, "Design of Cyclones with High Solids Entrance Loads", *Chem. Eng. Technol.* 21, pp. 716-719, 1998.

*Primary Examiner*—Robert A Hopkins
*Assistant Examiner*—Minh-Chau Pham
(74) *Attorney, Agent, or Firm*—Ryan A. Schneider, Esq.; Troutman Sanders LLP

(57) ABSTRACT

The system of the present invention includes a centripetal cyclone for separating particulate material from a particulate laden gas solids stream. The cyclone includes a housing defining a conduit extending between an upstream inlet and a downstream outlet. In operation, when a particulate laden gas-solids stream passes through the upstream housing inlet, the particulate laden gas-solids stream is directed through the conduit and at least a portion of the solids in the particulate laden gas-solids stream are subjected to a centripetal force within the conduit.

19 Claims, 14 Drawing Sheets

U.S. PATENT DOCUMENTS

| | | | |
|---|---|---|---|
| RE34,814 E | 1/1995 | Magaldi | 110/165 |
| 5,443,022 A | 8/1995 | Winkin et al. | 110/245 |
| 5,797,334 A | 8/1998 | Weitzel | 110/245 |
| 5,954,000 A | 9/1999 | Panos | 110/165 |
| 6,230,633 B1 | 5/2001 | Magaldi et al. | 110/189 |
| 6,540,802 B2 * | 4/2003 | Trautmann et al. | 55/337 |
| 7,003,965 B2 | 2/2006 | Auer et al. | 62/50.2 |
| 7,044,998 B2 * | 5/2006 | Soderberg | 95/271 |
| 7,115,157 B2 * | 10/2006 | Flynn et al. | 95/271 |
| 7,351,326 B1 * | 4/2008 | Owen | 208/113 |

\* cited by examiner

METHOD AND APPARATUS FOR THE SEPARATION OF A GAS-SOLIDS MIXTURE IN A CIRCULATING FLUIDIZED BED REACTOR

STATEMENT REGARDING FEDERALLY SPONSORED RESEARCH OR DEVELOPMENT

This invention was made with United States Government support under Cooperative Agreement No. DE-FC21-90MC25140 awarded by the Department of Energy (DOE). The United States Government has certain rights in the invention.

FIELD OF THE INVENTION

This invention relates to the separation of gas and solids mixtures through an assembly of particulate collection devices and the method of operating the devices. In particular, the invention relates to a method and apparatus for the separation of gas-solids mixture in a circulating fluidized bed (CFB) reactor used as a combustor, gasifier, fluid catalytic cracker (FCC), or gas-highly dispersed solids contactor.

BACKGROUND OF THE INVENTION

A circulating fluidized bed (CFB) reactor can function as a heavy oil cracker, combustor or gasifier to process carbonaceous materials. For all of these applications, the reactor typically comprises similar components, namely a riser, a particulate collections system, a standpipe and a solids flow control valve. In addition, the reactors used for these various applications also operate in a similar manner, namely by: providing an upward flow of gas-solids mixture in the riser; collecting particles from the gas and conveying the collected particles to the standpipe; and gravitationally flowing the collected particles in the standpipe and particles flowing through a valve located in the bottom of the standpipe to the bottom of the riser.

For most CFB reactors, feed material is added to the lower portion of the riser whereby the gas and solids mixture flows upward at velocities varying from 25-70 ft/s. The gas-solids mixture then exits at the top of the riser and moves through a conventional particulate collection system. To that end, it is highly desirable to have the particulate collection system operate with the highest efficiency possible and with minimum erosion of the wall liners of the collection apparatus.

Broadly speaking, three types of gas-solid separation devices are in practice in conventional CFB systems: a gravity separator, such as disengager; a flow impactor, such as U-beams and finned tube separators; and a centrifugal separator or centrifugal cyclone. Both the gravity separator and the flow impactor are suitable for separating particles with diameters larger than 100 microns from the gas stream. The essential advantage provided by these two types of separators is reduced erosion on the walls resulting from high concentrations of large particles. In contrast, the erosion on a wall of a centrifugal separator or centrifugal cyclone often becomes a serious concern because of larger particle sizes. Hence, to achieve a balance between a minimum erosion and maximum collection efficiency, typical particulate collection systems comprise a combination of an upstream disengager or flow impactor and a downstream centrifugal cyclone. This combination allows for the removal of larger particles and a significant reduction in particle loading before entering the cyclone.

Although the gravity separator used in tandem with a centrifugal cyclone can take advantage of the characteristics of both devices, the integration faces serious challenges too. For example, the large footprint and vessel size of the disengager as well as the increased cost incurred are some of the challenges encountered when integrating these systems.

More specifically, since a gravity separator utilizes the acceleration of gravity to allow solid particles to settle away from a gas stream, the drag exerted on the particles by gas must be much less than that by the gravity to separate the particles from the gas stream. Roughly speaking, the superficial gas velocity in the gravity separator should therefore be less than 1 ft/s to separate particles with diameters larger than 100 microns. As a result, the diameter of an efficient disengager typically needs to be on the order of 3-9 times larger than that of a riser, which itself has an inner diameter of 4-6 ft for most commercial reactors. Thus, the larger the disengager must be, the more expensive it will be for both fabrication and transportation. Further, because the particle collection efficiency is generally low in the disengager, the particle concentration in the carrying gas may still be relatively high at the centrifugal cyclone inlet and may still cause significant erosion problems on the wall of the cyclone.

Typically, high particulate collection efficiency in a cyclone is intimately associated will high erosion rates on the wall because the solids and gas are spun on the same surface at a high rate of speed. Thus, it presents another challenge as to how to utilize the cyclonic effect without the resulting erosion of the cyclone wall. To date, all efforts have been directed to finding the most erosion resistance materials to prolong the refractory liner of the centrifugal cyclone.

Still another challenge for using the above noted combination of the disengager and cyclone is the method of transporting the fines collected in the cyclone to the standpipe. For relatively low temperature operations of about 1000° F. in the FCC system, the disengager also functions as the housing for cyclones and a dipleg is connected to the bottom of the cyclone and discharges the solids to a fluidized bed inside the disengager vessel. In such applications, special care is required to make certain that solids flow through the dipleg is smooth, without stoppage either from gas flowing upwards in the dipleg to the cyclone or from the solids packing in the cyclone dipleg. This has proven to be a difficult task. For example, U.S. Pat. No. 6,569,317 B1 teaches the use of a trickle valve installed in the solids exit in the dipleg to prevent gas from flowing upward in the dipleg. However, this configuration becomes impractical for gasification and combustion operations of a CFB, where the solids collected in the cyclone are at temperatures in the range of about 1600-1900° F.

Furthermore, in the latter CFB application, the circulating particles are typically ash from fuel. These particles are typically irregular in shape and vary during the operations with the fuel fed. To transport these particles under high temperatures and high pressures, the cyclone and the disengager are typically designed and operated as separate vessels with the cyclone's gas inlet connected to the disengager's gas outlet. The particles collected in the cyclone are then recycled to the standpipe through various non-mechanical valves. Since the particles collected in the cyclones generally have the top size particles of 100 μm and the mass mean particle size less than 30 μm, the bulk density of these small particles are much lower than that of the larger particles and the static head of the same height of the bed materials is also lower. Hence, to overcome the same pressure difference, the bed height or the dipleg height has to be excessively tall. Furthermore, due to the small size of particles, the particles tend to have a low setting velocity and therefore the diameter of the cyclone dipleg must be excessively large. Both these factors will increase the cost of the collections system.

Accordingly, what is needed but unavailable in the art, is an improved method and apparatus for separating particulate material from a particulate laden gas-solid process stream. In particular, there is a need for an improved apparatus and method that can enable efficient separation of relatively large particles from particulate laden gas solid stream without encountering the aforementioned disadvantages and challenges that exist in the conventional apparatuses and methods described above.

SUMMARY OF THE INVENTION

The goal of this invention is to overcome above-mentioned difficulties in designing and operating particulate collection system in the CFB reactors where the operating environment involves the high solids circulation rates, high temperatures and pressures. Specifically, the intention of this invention is to improve particle collection efficiency, reduce erosion of cyclone walls and to reduce overall size of the equipment for the same reactor capability and to make the operation of the cyclone assembly reliable for CFB as a gasifier or a combustor.

In one aspect, a desaltation device for separating particulate material from a particulate laden gas solids stream in a system of the present invention comprises a centripetal cyclone. According to this aspect, the centripetal cyclone comprises a housing defining a conduit extending between an upstream inlet and a downstream outlet. In an exemplary aspect, the cross-sectional area of the downstream outlet has a larger cross-sectional area than the upstream inlet. In another aspect, a least a portion of a conduit bottom surface tapers downwardly and away from the conduit top surface. In operation, when a particulate laden gas-solids stream passes through the upstream housing inlet, the particulate laden gas-solids stream is directed through the conduit and at least a portion of the solids in the particulate laden gas-solids stream are subjected to a centripetal force within the conduit.

Related methods of operation are also provided. Other systems, methods, features, and advantages of the particulate collection system for use in CFB reactors will be or become apparent to one with skill in the art upon examination of the following figures and detailed description. It is intended that all such additional systems, methods, features, and advantages be included within this description, be within the scope of the particulate collection system for use in CFB reactors, and be protected by the accompanying claims.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention. Like reference characters used therein indicate like parts throughout the several drawings.

DETAILED DESCRIPTION OF THE INVENTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "centripetal cyclone" includes aspects having two or more such centripetal cyclones unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Figure 1:
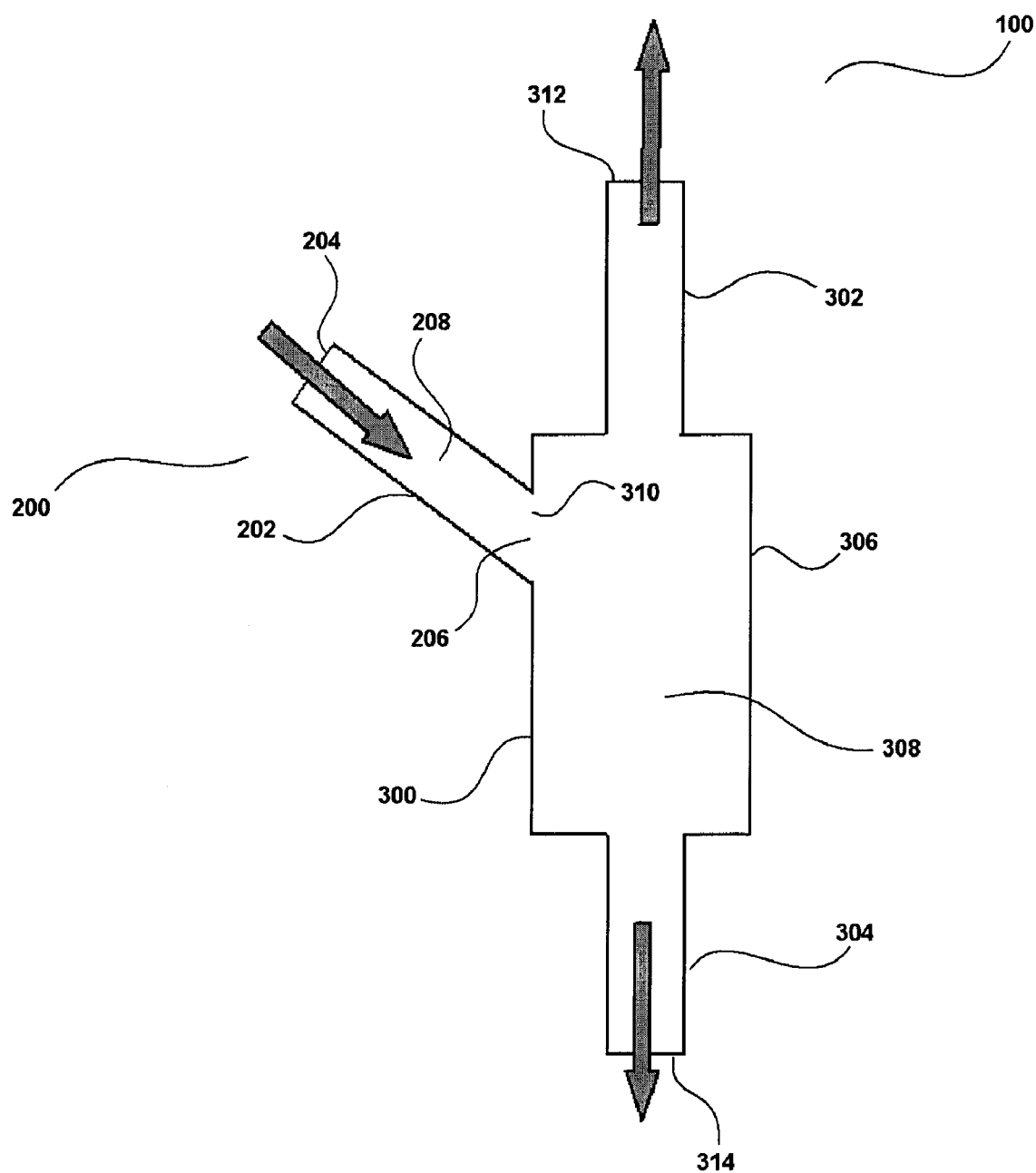
FIG. 1 is a schematic illustration of an embodiment of a desaltation device of the present invention, showing an elongated inclined cross over and an elongated desaltation vessel.

Referring now to the figures, in which like reference characters indicate like parts throughout the several views, a first aspect of the present invention is generally shown in FIG. 1. As shown, the present invention provides a desaltation device 100, comprised generally of an elongated inclined cross over 200 and an elongated desaltation vessel 300. The inclined cross over is comprised of a cross over housing 202 having an upstream receiving inlet 204, an opposed spaced apart downstream outlet 206, and a continuous side wall extending there between, which forms an inclined cross over conduit 208. The cross over housing can be constructed in known fashion and from known materials suitable for accommodating the passage of a hot pressurized fluid, such as a particulate laden gas process stream.

The desaltation vessel 300 is formed about a substantially vertical longitudinal axis and is also constructed in known fashion and from known materials suitable for accommodating the passage of a hot pressurized fluid, such as a particulate laden gas process stream. The vessel has a top portion 302, an opposed spaced apart bottom portion 304, and a continuous side wall 306 extending there between, which forms a desaltation chamber 308 within the desaltation vessel. A process stream receiving port 310 is defined within the vessel sidewall and is in communication with the inclined cross over conduit 208 and the desaltation chamber 308. A reduced particulate laded process stream discharge port 312 is formed within the top portion of the desaltation vessel and is communication with the desaltation chamber 308. The reduced particulate laded process stream discharge port 312 can be used for discharging a reduced particulate laden process stream from the desaltation vessel for further downstream processing. A first solid stream discharge port 314 is formed within the bottom portion of the desaltation vessel and is also communication with the desaltation chamber 308. The first solid stream discharge port 314 can be used for discharging a solid stream from the desaltation vessel for further downstream processing.

As briefly summarized above, the desaltation device 100 can be used in a particulate separation and/or collection system to separate and/or collect particulate material from a particulate laden gas-solids stream. More specifically, in use an exemplary particulate laden gas-solid streams, such as those known for use in circulating fluidized bed (CFB) reactors, i.e., a combustor, gasifier, fluid catalytic cracker (FCC), or gas-highly dispersed solids contactor, can be received by the upstream inclined cross over receiving inlet 204 and directed toward the downstream out 206, whereby the particulate laden process stream has been separated into a first reduced particulate laden process stream and a first dense solid stream. The reduced particulate laden process stream can then enter the desaltation chamber 308 through the process stream inlet port 310 and be directed toward the top portion 302 of the desaltation vessel and subsequently discharged through the reduced particulate laded process stream discharge port 312 for subsequent downstream processing. The first dense solid stream can also enter the desaltation chamber 308 through the process stream inlet port 310 and be directed toward the bottom portion 304 of the desaltation vessel. Once received by the bottom portion of the receiving vessel, the dense solid stream can be discharged through the dense solid stream discharge port 314 for subsequent downstream processing.

Figure 2:
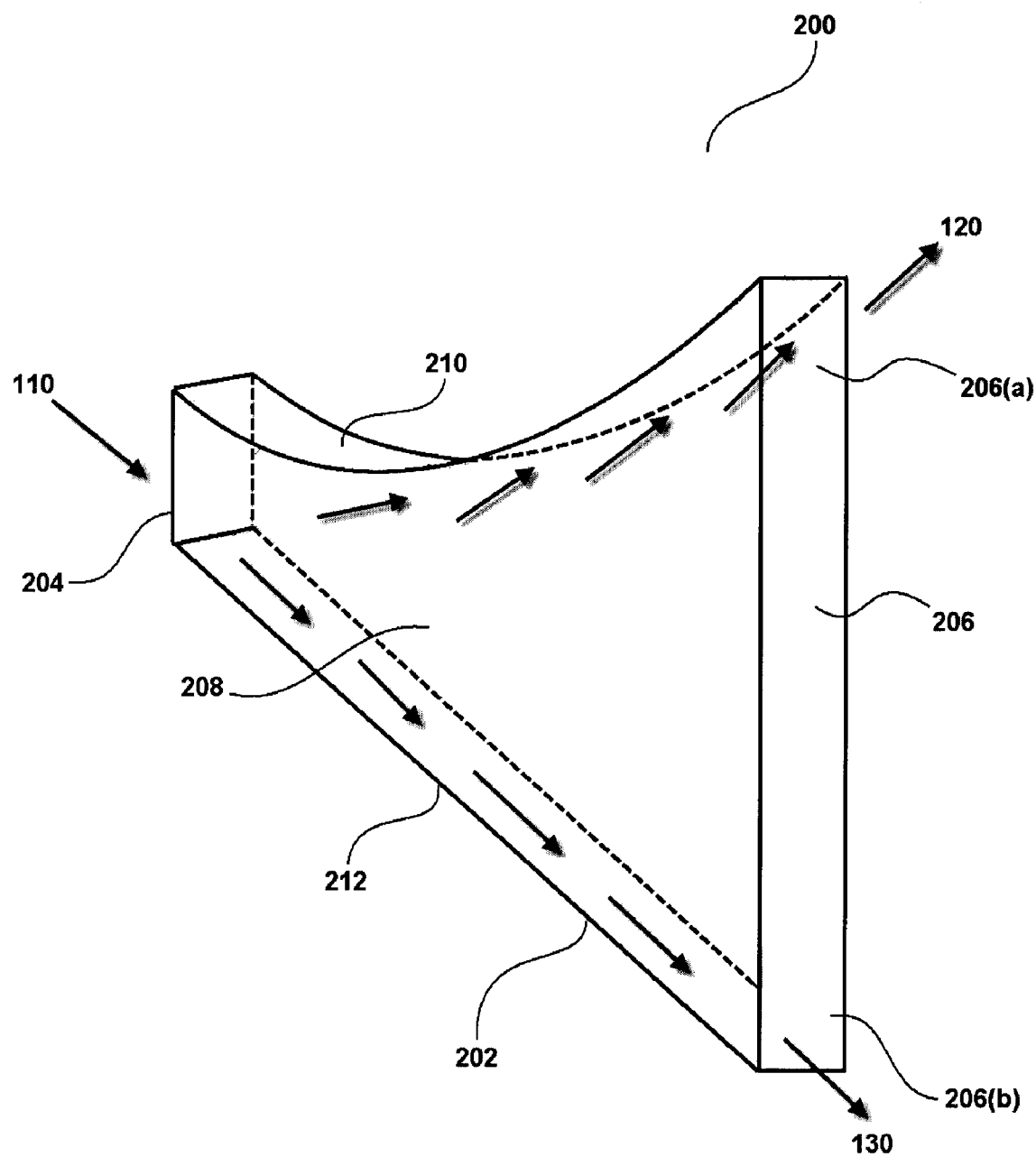
FIG. 2 is a perspective schematic illustration of an exemplary inclined cross over, showing a cross over housing having an upstream receiving inlet, an opposed spaced apart downstream outlet, and a continuous side wall extending there between, forming an inclined cross over conduit.

With reference to FIG. 2, an exemplary inclined cross over 200 is shown. The inclined cross over is comprised of a cross over housing 202 having an upstream receiving inlet 204 having a first cross-sectional area, an opposed spaced apart downstream outlet 206 having a second cross-sectional area, and a continuous side wall extending there between, forming an inclined cross over conduit 208. At least a portion of the downstream outlet 206 is positioned below at least a portion of the upstream inlet 204.

The upstream inlet 204 can have any desired shape, including for example, a rectangular, elliptical, oval, or even a substantially circular shape. Similarly, the downstream outlet 206 can also have any desired shape, including for example, a rectangular, elliptical, oval, or even a substantially circular shape. In one aspect, the upstream inlet is substantially circular in cross-sectional shape and the downstream outlet is substantially rectangular in cross-sectional shape.

The inclined cross over conduit 208 is further comprised of an integrally formed top surface portion 210 and bottom surface portion 212. The top surface portion and the bottom surface portion are constructed and arranged such that when a particulate laden gas-solids stream 110 is received by the upstream housing inlet 204 and directed through the conduit toward downstream outlet 206, at least a portion of the solid or particulate material entrained within the particulate laden gas-solids stream mixture is subjected to a centripetal force within the conduit that is sufficient to separate at least a portion of the particulate material from the particulate laden gas-solid stream mixture.

In one aspect, the top conduit portion and the bottom conduit portion can extend, from upstream to downstream, substantially parallel to each other such that the inclined conduit 208 comprises a substantially uniform cross-sectional area between the upstream inlet and the down stream outlet. For example, the conduit 208 can be a conventional cross-over pipe extending downwardly from upstream to downstream at any angle between 0 and 90 degrees relative to horizontal or ground level.

In another aspect, at least a portion of the conduit bottom surface portion 212 can extend downward and away from at least a portion of the conduit top surface portion 210 such that the cross-sectional area of the downstream outlet 206 is greater than the cross-sectional area of the upstream inlet 204. In still a further aspect, the bottom surface portion can be non-planar, such as, for example, arcuate in shape, such that at least a portion of the bottom surface extends, from upstream to downstream, arcuately downward and away from the top surface portion 210.

Alternatively, and as shown in FIG. 2, the bottom surface portion 212 can be substantially planar such that at least a portion of the bottom conduit surface portion extends in a substantially continuous plane, from upstream to downstream, downward and away from at least a portion of the top surface portion 210. Accordingly, in one aspect, a downward extending planar bottom surface portion can form an angle between 0 and 90 degrees, relative to a horizontal axis, i.e., ground level. For example, the bottom surface portion can extend downward at an angle in the range of from 45 to 80 degrees, including exemplary angles of 50, 55, 60, 65, 70, and 75 degrees. In still anther aspect, the angle formed between the downward extending portion of the bottom surface portion and the horizontal axis can be selected to be at least greater than the angle of repose of one or more particulate materials entrained within a particulate laden gas-solid stream that is to be directed through the inclined cross over 200.

The inclined conduit top surface portion 210 can in one aspect be at least substantially planar. For example, an exemplary planar conduit top surface portion can extend, from upstream to downstream, in a plane substantially parallel to the horizontal axis. Alternatively, a planar conduit top surface portion can extend, from upstream to downstream, in a plane substantially parallel to a planar bottom surface portion. In another aspect, at least a portion of a planar top surface portion 210 can extend in a plane, from upstream to downstream, upward and away from the horizontal axis. In still another aspect, the top surface portion 210 can be non-planar. For example, as shown in FIG. 2, an exemplary non-planar conduit top surface portion can be arcuate in shape such that at least a portion of the top surface extends, from upstream to downstream, arcuately upward and away from a horizontal axis.

The inclined cross over of the present invention enables a novel method for separating particulate material from a particulate laden gas-solids stream. In one aspect, the particulate laden gas-solid stream mixture can, for example, have an operating temperature in the range of from approximately 1000° F. to 2000° F. In still a further aspect, the particulate laden gas-solid stream mixture can comprise a solids to gas loading ratio in the range of from 10 to 60 pounds of particulate material per pound of gas. Furthermore, exemplary particulate laden gas-solids mixture can also exhibit a flow velocity in the range of from, for example, 25-75 feet per second.

In use, a supplied particulate laden gas-solids mixture can be received by the upstream cross over inlet 204 of the desaltation device. Once received by the upstream inlet, the particulate laden gas-solids stream can be directed through at least a portion of the inclined cross over conduit 208 toward the downstream outlet 206. As the particulate laden gas stream is directed through at least a portion of the conduit 208, at least a portion of the particulate material in the particulate laden gas solids stream is subjected to a centripetal force sufficient to separate at least a first portion of the particulate material from the gas-solids stream such that a reduced particulate laden gas stream 120 and a first dense solid stream 130 pass through the downstream outlet 206 and are each received by the desaltation vessel through process stream receiving inlet 310.

More specifically, and without limitation, in one aspect the inclined conduit is constructed and arranged such that the gas phase of the particulate laden gas-solid mixture will accelerate toward the top surface portion 210 of the cross over conduit. As the gas phase accelerates toward the top surface portion, the gas phase can begin to spin as it flows near the top surface portion 210. The spinning gas provides a centripetal force that can expel entrained particulates away from the gas phase toward the bottom surface portion of the conduit 208.

Figure 3:
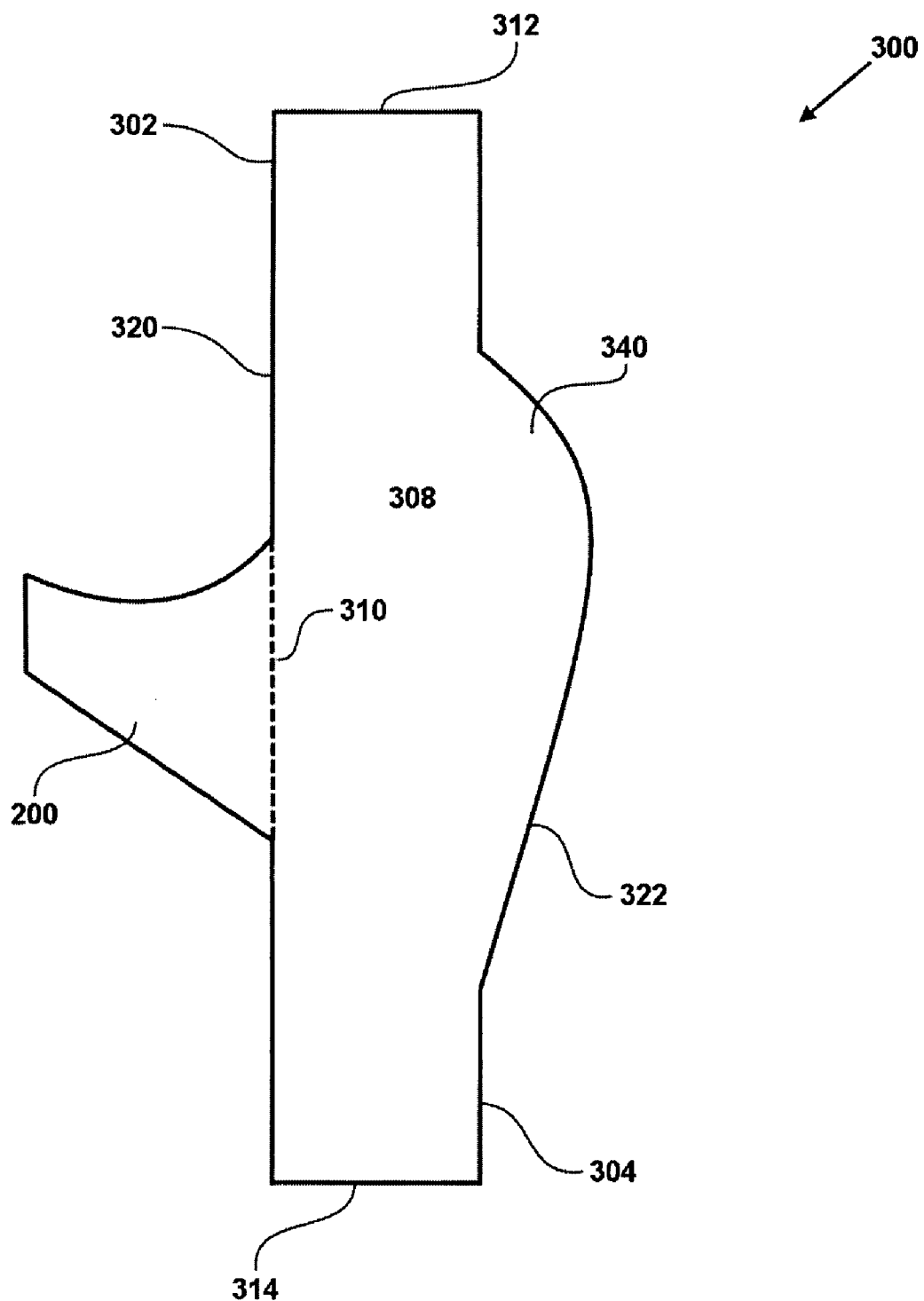
FIG. 3 a schematic illustration of an exemplary desaltation vessel of the present invention.

With reference to FIG. 3, an exemplary desaltation vessel 300 according to one aspect of the present invention is shown. The desaltation vessel 300 is formed about a substantially vertical longitudinal axis and is also constructed in known fashion and from known materials suitable for accommodating the passage of a hot pressurized fluid, such as a particulate laden gas process stream. The vessel has a top portion 302, an opposed spaced apart bottom portion 304, and a continuous side wall 306 extending there between, forming a desaltation chamber 308 within the desaltation vessel. A process stream receiving port 310 is defined within the vessel sidewall and is in communication with the inclined cross over conduit 208 and the desaltation chamber 308. A reduced particulate laden process stream discharge port 312 is formed within the top portion of the desaltation vessel and is communication with the desaltation chamber 308. The reduced particulate laded process stream discharge port 312 can be used for discharging a reduced particulate laden process stream from the desaltation vessel for further downstream processing. A first solid stream discharge port 314 is formed within the bottom portion of the desaltation vessel and is also communication with the desaltation chamber 308. The first solid stream discharge port 314 can be used for discharging a solid stream from the desaltation vessel for further downstream processing.

The desaltation vessel side wall is further comprised of an integrally formed receiving surface portion 320 and an opposed impact surface portion 322. As illustrated, the process stream receiving inlet 310 is defined in a portion of the receiving surface portion 320 and is integrally formed with the downstream outlet 206.

The desaltation vessel can be constructed and arranged to provide a desaltation chamber having any desired size and shape. However, in one aspect, the desaltation chamber is substantially cylindrical.

The downstream outlet of the inclined conduit can be constructed and arranged such that a process stream exiting the downstream outlet, i.e., a reduced particulate laden gas stream and/or a solid stream, will enter the desaltation conduit tangentially. The tangential introduction of a particulate laden fluid stream into a cylindrical desaltation conduit can further enhance the collection and/or separation efficiency of the desolation device by subjecting entrained particles in the gas phase of a process stream to centrifugal forces resulting from the rotational fluid motion of the process stream around the contour of the desaltation chamber.

The desaltation vessel 300 further comprises a top vessel portion 302 and a bottom vessel portion 304. The top portion 302 comprises a substantially vertical longitudinal flow axis 302(a) and can further be configured to receive a first reduced particle laden gas-solids stream from the downstream outlet 206 of the inclined conduit 208. In use, the top portion 302 can receive and direct a reduced particulate laden gas-solids stream further downstream for subsequent processing, including for example, introducing a reduced particulate laden gas stream to a second stage cyclone wherein the reduced particulate laden gas-solids stream can be separated into a second solid stream and a substantially particle free process gas. In one aspect, the top portion 302 further comprises a reduced particulate laden process stream discharge port 312 that is formed within the top portion of the desaltation vessel and is in communication with the desaltation chamber 308.

The bottom portion 304 of the desaltation vessel can also be configured to receive a first solid stream from the downstream outlet 206 of the inclined cross over conduit 208. Thus, in use, the bottom conduit portion 304 can provide a solid stream drain pipe for collecting and subsequently directing the first solid stream downstream for additional processing, including for example, introducing the solid stream to a standpipe and/or recirculating the solid stream to the particle bed of a fluidized bed reactor. Accordingly, the bottom portion 304 further comprises a first solid stream discharge port 314 that is formed by the bottom portion of the desaltation vessel and is communication with the desaltation chamber 308.

A portion of the impact surface 322 of the vessel side wall can optionally form an impact recess 340 relative to the longitudinal flow axis of the desaltation vessel top portion. At least a portion of the recessed impact surface can be positioned above at least a portion of the process stream receiving port 310 and in a plane that intersects the longitudinal flow axis of the desaltation vessel top portion. To that end, the optional impact recess can be configured in any desired shape, however, in one aspect and as exemplified in FIG. 3, the recessed impact surface can form a portion of a sphere such as, for example, a lune or spherical cap. To this end, it will be appreciated by one of ordinary skill in the art that, during use, a reduced particulate laden gas-solids stream received by the top portion 302 of the desaltation vessel can impinge upon or impact the optional impact recess surface thus disrupting the otherwise substantially vertical flow of the process stream. The resulting disruption and reduction in process stream velocity and or change in process stream flow direction can lead to further separation of particulate material from the reduced particulate laden gas solid stream, thus enhancing particulate collection and/or separation efficiency resulting from the desaltation device.

In still another aspect, the present invention provides a particulate collection system comprising a desaltation device 100 as described above and at least one additional cyclone positioned downstream from and in fluid communication with the reduced particulate laden process stream discharge port 312. As will be described in more detail below, a particulate collection system of the present invention can for example, and without limitation, be incorporated into a circulating fluidized bed reactor configured for use as a combustor, gasifier, fluid catalytic cracker (FCC), or gas-highly dispersed solids contactor.

Figure 4:
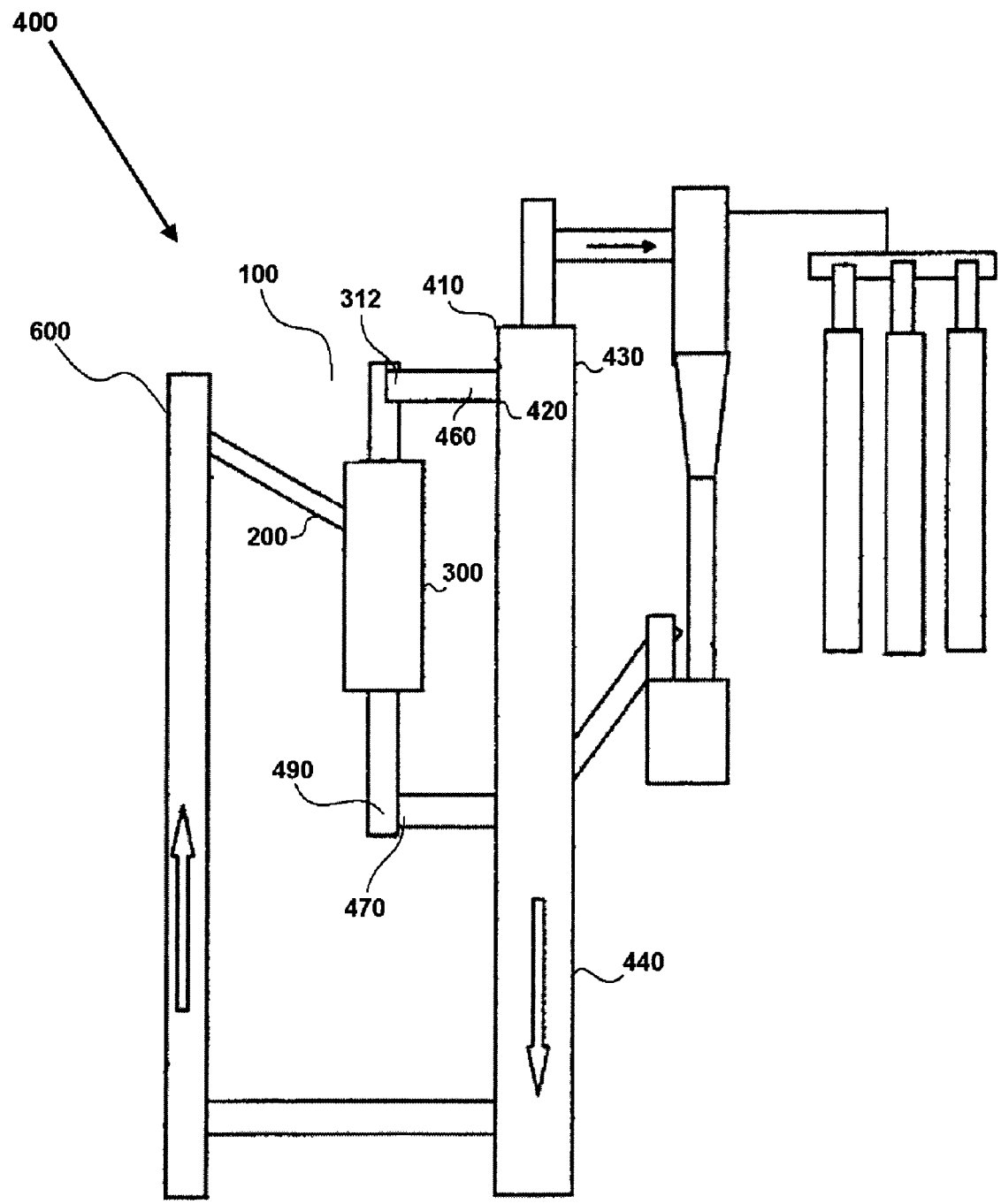
FIG. 4 a schematic illustration of an exemplary circulating fluidized bed reactor of the present invention, showing a particulate collection system.

Referring now to FIG. 4, an exemplary circulating fluidized bed reactor 400 comprising a particulate collection system according to the present invention is shown. As shown, the circulating fluidized bed reactor comprises a desaltation device 100 as described above, comprised of an inclined cross over 200 and a desaltation vessel 300. A cyclone 410, having a process stream receiving inlet 420 is connected to and in fluid communication with the reduced particulate laden gas discharge outlet 312 of the desaltation vessel 300.

The cyclone 410 can in one aspect be a conventional centrifugal cyclone. Alternatively, the second cyclone can be a second desaltation device as described in accordance with the present invention. As exemplified, the cyclone 410 is a coneless standpipe having a top portion 430 and a bottom portion 440. The reduced particulate laden gas-solid stream discharge outlet 312 is connected to the receiving inlet of the cyclone by, for example, a conventional cross over pipe 460. In one aspect, the cross over pipe 460 can also be an inclined cross over.

In use, the stream enters the cyclone tangentially at, for example, a velocity in the range of from 40-100 ft/s depending on such variables as the percentage solids loading, particle size in the gas stream, and the diameter of the cyclone barrel. The tangential introduction will result in the particle laden gas stream spinning along the inner cyclone wall. This spinning or rotation of the gas stream will operate to remove solids particles from the gas stream. The gas stream having solids particles removed therefrom to provide a reduced solids loading gas stream will exit the top of the cyclone. In one aspect, a vortex finder (not shown) can be installed at the cyclone exit. The solids particles removed from the stream will flow downward along the standpipe and can then be recycled to the riser. The solids particles collected can also be merged with the solids from the desaltation vessel.

In still another aspect, the standpipe cyclone efficiency can be enhanced by the globe downward flow gas in the standpipe. Accordingly, it will be appreciated upon practicing the present invention that the cyclone efficiency can be optimized by adjusting overall solids circulation rate within the circulating fluidized bed loop.

The bottom portion 304 of the desaltation vessel, as described above, is configured to receive a first solid stream from the downstream outlet 206 of the inclined cross over. Thus, in operation, the bottom conduit portion 304 functions as a solid stream drain pipe for collecting and/or directing the first solid stream downstream for additional processing, which can include, for example and not meant to be limiting, introducing the solid stream to the desired location of the standpipe and/or recirculating the solid stream to the particle bed of a fluidized bed reactor. Accordingly, the bottom portion 304 of the desaltation vessel further comprises a solid stream discharge outlet 314.

Figure 5:
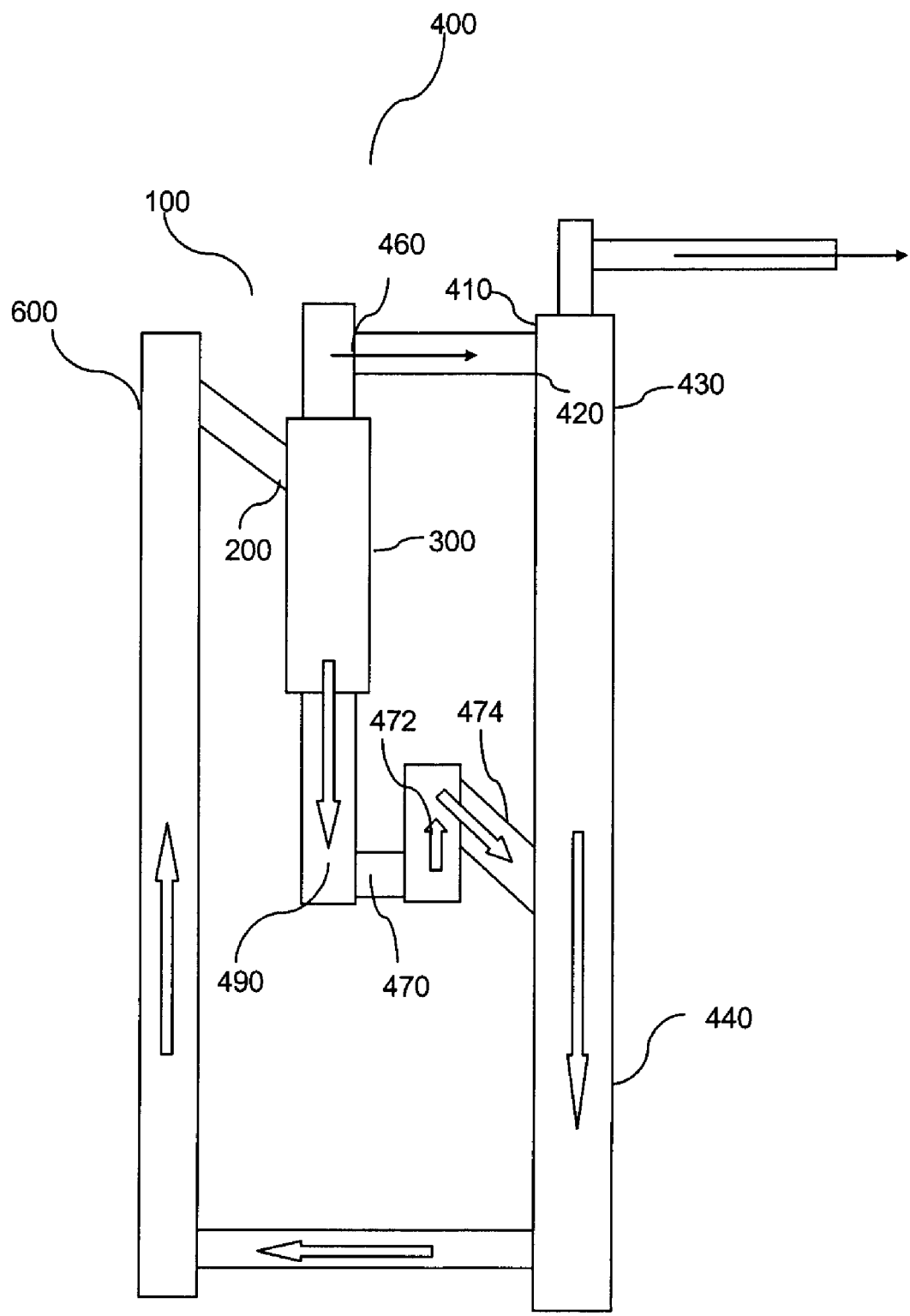
FIG. 5 is a schematic illustration of an exemplary circulating fluidized bed reactor of the present invention, showing a particulate collection system with a seal leg to return the collected solids to the standpipe.

As illustrated, the solid stream discharge outlet can be positioned in fluid communication with the a desired location of the stand pipe. Specifically, a solid stream cross over pipe 470 can be used to provide a solid stream cross over conduit that can direct a solid stream into the lower portion 440 of the stand pipe cyclone 410. The solid stream cross over pipe can in one aspect be substantially horizontal. Alternatively, in another aspect, at least a portion of the solid stream cross over pipe 470 can be inclined such that it forms an inclined conduit extending downward and away from the bottom portion of the drain pipe. As exemplified, the cross over pipe 470 can further comprises a conventional L-valve 476 as a part of cross over pipe having, for example, a length to diameter ratio in the range of from approximately 2 to 4 in combination with the inclined pipe 480 to form a group of interconnected conduits to convey solids from desaltation pipe to the standpipe, as illustrated in FIG. 5, which represents a variation of the configuration of FIG. 4. The function of the inclined pipe 480 is to avoid excessive horizontal length of the L-valve 476.

Figure 6:
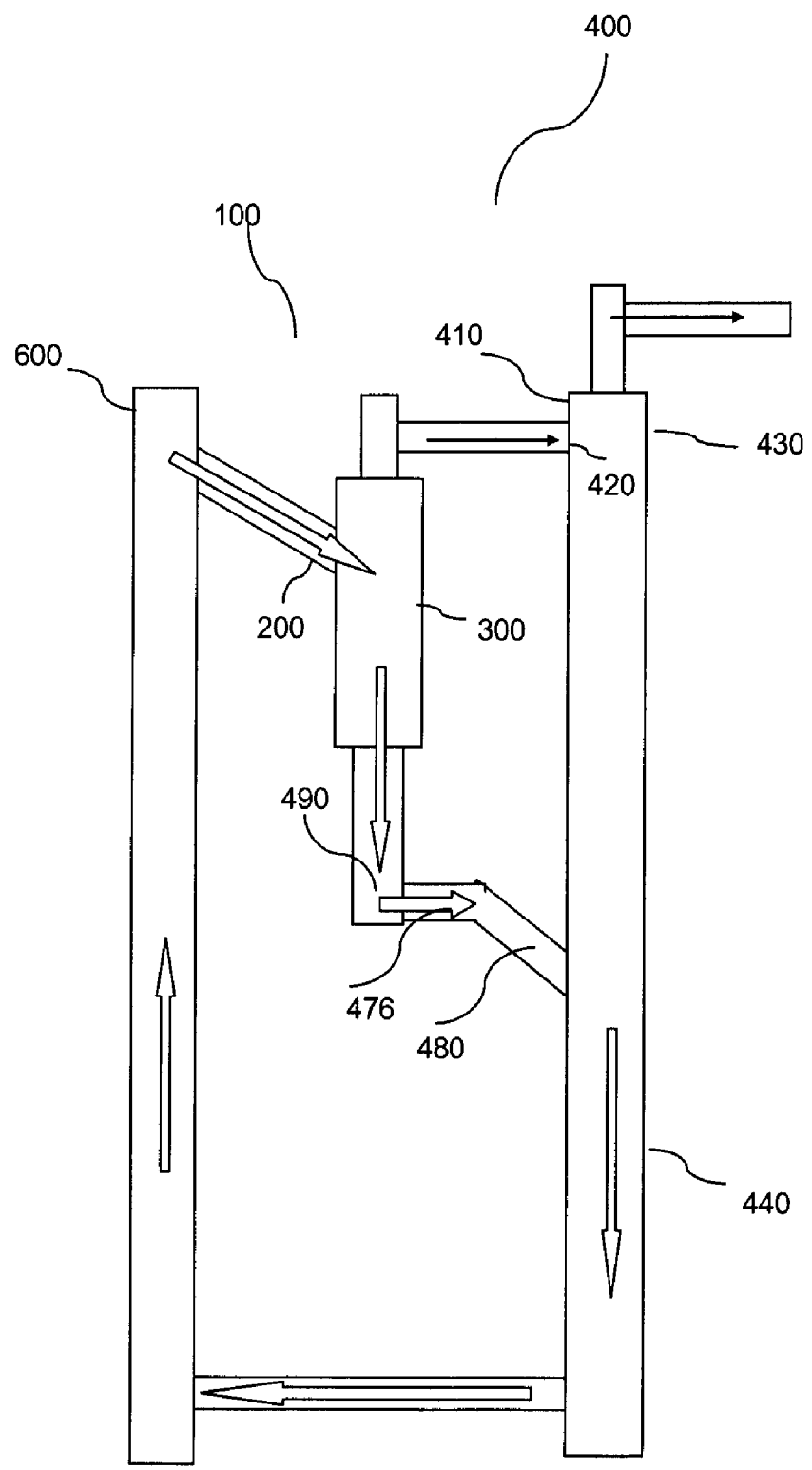
FIG. 6 is a schematic illustration of an exemplary circulating fluidized bed reactor of the present invention, showing a particulate collection system with an L-Valve and inclined leg to return the collected solids to the standpipe.

With reference to FIG. 6, in another aspect of the present invention, the interconnection between the drain pipe of the desaltation vessel 490 and the standpipe 440 can be a sealeg. In this configuration, the solids withdrawing from the desaltation vessel 300 through the drain pipe 490 flow through a cross over, such as a substantially horizontal pipe, to a riser 472 and then flow to the proper location in the standpipe.

In use, the particulate collection system of the present invention provides a method for separating and/or recirculating solids in a circulating fluidized bed reactor. The solids or particulate material to be separated can be entrained within a particulate laden gas-solids mixture. To that end, the particulate laden gas solids mixture can for example have an operating temperature in the range of from approximately 1000° F. to 2000° F. The velocity of the particulate laden gas solid stream in which particles are entrained may, for example, be in the range of from 25-75 feet per second. Additionally, the particulate laden gas-solids stream can comprise a solids to gas loading ratio in the range of from 10 to 60 pounds of particulate material per pound of gas.

Generally, the method comprises the steps of providing a particulate laden gas-solids stream, as described above, in a line downstream from the riser of a circulating fluidized bed reactor and upstream from an inclined cross over, such as the centripetal cyclone described herein. The particulate laden gas-solids stream can be delivered into the centripetal cyclone wherein the particulate laden gas-solids stream is separated into a reduced particulate laden gas-solids stream and a first dense stream of solids. The first dense stream of solids can be delivered to a standpipe. The reduced particulate laden gas-solids stream can be delivered to a second cyclone wherein the reduced particulate laden gas-solids stream is subsequently separated into a substantially particulate free process gas and a second dense stream of solids. The substantially particulate free process gas can then be delivered to a vent line for downstream processing. The second dense stream of solids can be collected in the bottom portion of the standpipe. The first and second solid streams that have been delivered to the standpipe can then be fluidized by introducing a flow of inert gas into the standpipe. The fluidized solids can then be recirculated from the standpipe to the circulating bed reactor through a solids feed conduit.

More specifically, and with reference to the exemplary circulating fluidized bed reactor shown in FIG. 4, a particulate laden gas-solids mixture will flow out of a riser 600. As the particulate laden gas-solid stream flows from the riser the stream will enter the upstream inlet 204 of the centripetal cyclone. In the centripetal cyclone at least a portion of the gas phase of the gas solids mixture will accelerate towards the upper wall creating a spinning motion of at least a portion of the gas phase. The centripetal force generated by the spinning gas phase will expel at least a portion of the particulate material in the gas-solids mixture generally tangentially to the gas streamline and downwardly and away from the top conduit portion toward the bottom conduit portion. In one aspect, substantially all particulate material having a particle diameter size larger than approximately 100 microns will be separated from the particulate laded gas-solids stream to provide a first solid stream.

The separated solids will then flow along the bottom conduit portion toward the downstream outlet 206. The velocity of the gas phase present near the bottom conduit portion will be relatively minimal and thus the erosive effect on the bottom conduit surface will be reduced. Similarly, the concentration of particulate material near the top surface portion of the conduit where gas phase velocities are much higher is also reduced, thus minimizing erosion resulting from the impact of particulate material on top surface portion of the centripetal cyclone conduit. To this end, by subjecting the particulate material within a gas-solids process stream to a centripetal force that spins particulate material away from the top surface portion, a relatively high particulate separation and collection efficiency can be achieved while also minimizing the erosive effects of the particulate material within the process stream.

The reduced particulate laden gas phase will continue to flow along or near the upper wall portion of the centripetal cyclone and tangentially enter the desaltation conduit. In one aspect, a reduced particulate laden gas-solids stream can comprise entrained solids having a particle size diameter in the range of 0 to 100 microns. Additionally, in another aspect, the mean particle size of the solids entrained within the reduced particulate laden gas solid stream can, for example, be in 10 to 30 micron range and particle densities ranging from 80 to 160 lb/cu ft.

After entering the desaltation conduit, at least a portion of the reduced particulate laden gas stream will optionally impinge upon the optional impact recess to further separate and collect particles entrained in the reduced particulate laden gas stream. The separated solids obtained by the impact upon the impact recess and from the solid stream exiting the centripetal cyclone will flow gravitationally downward into the drain pipe portion of the desaltation vessel. The collected solids in the drain pipe can then be transported by gravity to the standpipe through L-valve 490.

The reduced particulate laden gas stream exiting the desaltation vessel via cross over pipe 470 enters the standpipe cyclone 400 to further separate the reduced particulate laden gas-solid stream into a substantially particle free process gas and a second dense solid stream. In one aspect, the substantially particulate free process gas stream contains entrained solids having an average mean particle no greater than approximately 10 microns. In still a further aspect, the substantially particulate free process gas stream is substantially absent any entrained solids.

The reduced particulate laden gas stream can in one aspect enter the standpipe cyclone 400 tangentially. The tangential introduction of the reduced particulate laden gas stream into the standpipe cyclone results in the gas spinning along the inner wall of the standpipe cyclone. The resulting centrifugal force act to push entrained solid particles toward the standpipe cyclone wall. These collected particles will fall gravitationally toward the bottom portion and dense bed of the standpipe to be mixed with the solid stream separated and exiting from the centripetal cyclone into the drain pipe. The solids mixture in the standpipe can then be recycled from the bottom portion of the standpipe through a second L-valve back to the riser to complete the circulation loop.

EXAMPLES

To further illustrate the principles of the present invention, the following examples and experimental data are put forth so as to provide those of ordinary skill in the art with a complete disclosure and description of how the devices, systems and methods claimed herein can be made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C or is at ambient temperature, and pressure is at or near atmospheric.

I. Cold Flow Unit and Tests

Figure 7:
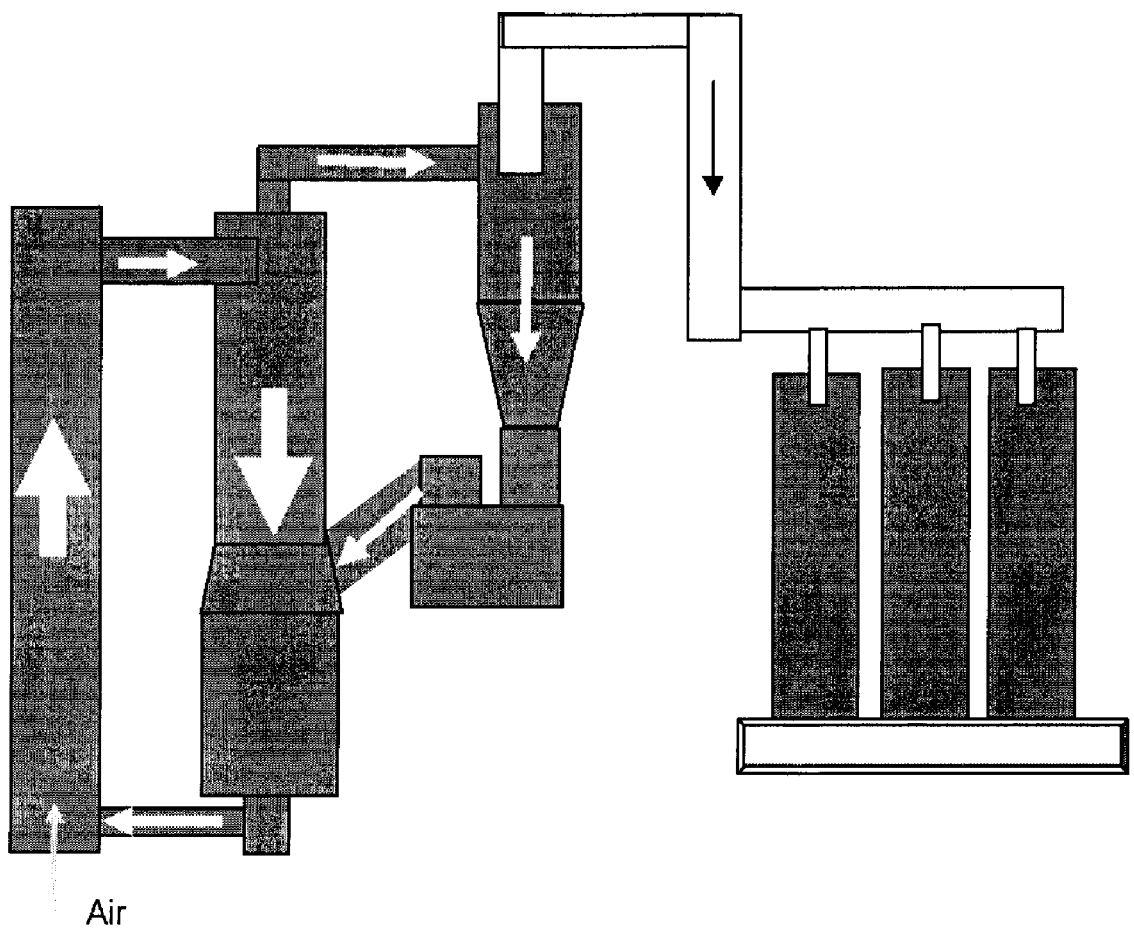
FIG. 7 is a schematic illustration of a conventional circulating fluidized bed cold flow model

As shown in FIG. 7, a conventional circulating fluidized bed (CFB) cold flow model was provided having an ID 4" Riser, a 3" crossover, an 8" coneless cyclone also called the first-stage cyclone, a 12" standpipe, a second-stage cyclone and a loop-seal and three bag filters. All pipes were made from plastic materials for easy visualization.

Figure 8:
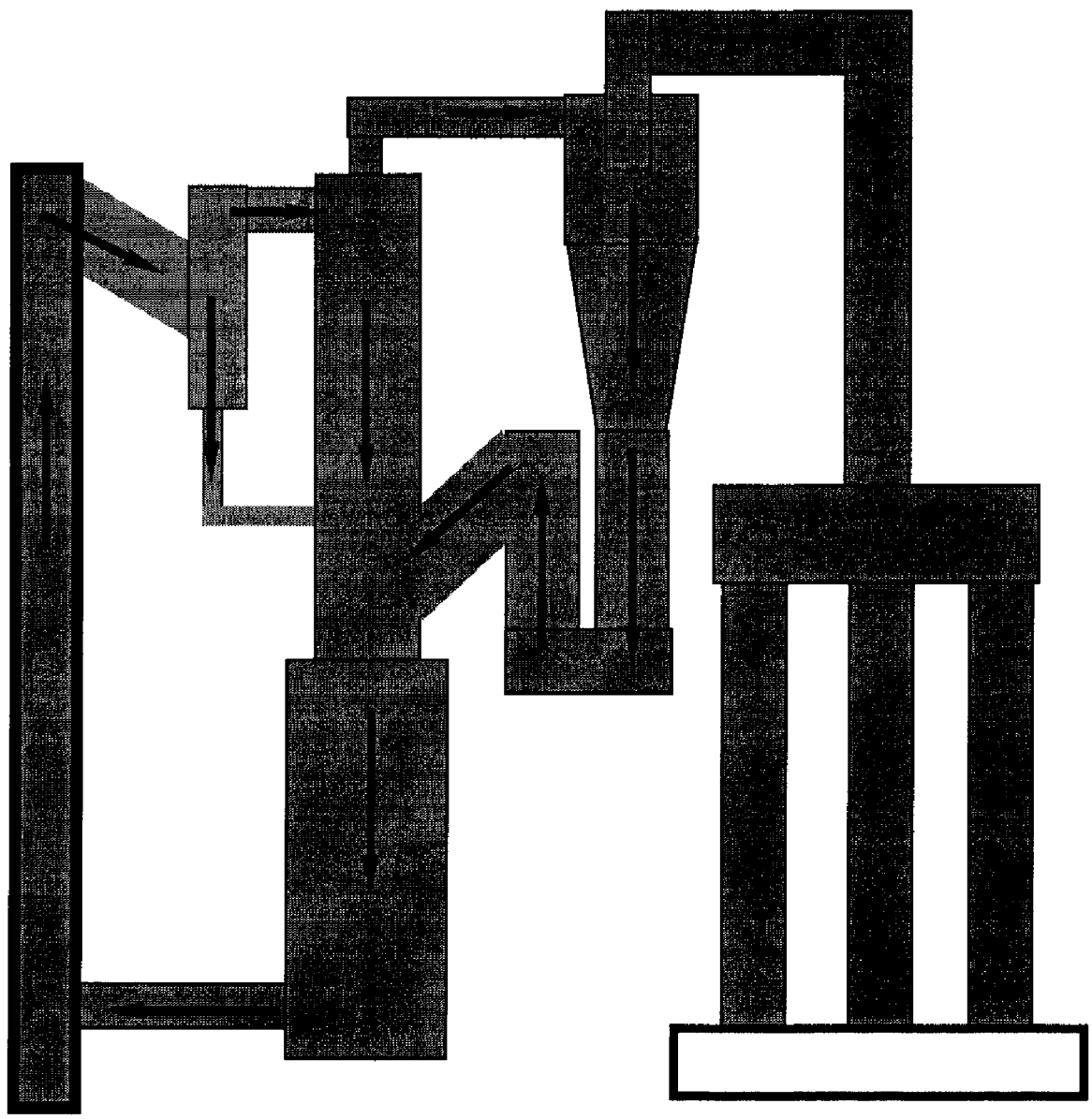
FIG. 8 is a schematic illustration of an exemplary circulating fluidized bed cold flow model according to one aspect of the present invention.

After initial comparative control test runs, the CFB system was modified to eliminate saltation in the crossover from the riser to the first-stage cyclone. The modified cold flow model is schematically shown in FIG. 8. Specifically, the cold flow model of FIG. 7 was modified to provide an inventive particulate collection system as described above, comprised of an inclined crossover, a tee and a section of vertical pipe with one end going to the cyclone entrance and the other to the standpipe through an L-valve. The function of the inclined crossover was to prevent solid saltation in the section so that solids can uniformly flow to the tee section. The purpose of the tee is to withdraw those solids precipitating from the gas stream at the tee. In this way, the gas stream with lower solid concentrations will have little or no solids saltation in the entrance of the cyclone. The L-valve provides a seal to prevent gas from directly escaping from the cyclone to the standpipe or vice-versa. As will be understood, another functionality of the inventive system is to eliminate the saltation without increasing gas velocity, thus minimizing the effects of cyclone erosion. The entire section including the tee connection, the drain pipe and the L-valve is referred to herein as the desaltation conduit or desaltation drain pipe (DDP). The inclined cross over is referred to herein as the centripetal cyclone.

The drain pipe consisted of two sections of pipes with diameters of 4 and 2 inches. The 4" section was directly connected to the cyclone entrance through the tee. Under the 4" pipe was the 2" pipe, which was connected to the standpipe through the 2" inside diameter (ID) L-valve. Two aeration nozzles were also installed in the drain pipe. One was approximately 4" above the horizontal leg of the L-valve and the other was approximately 4" above the connection point of the two pipes and on the four-inch-diameter pipe. If desired, by turning off or removing aeration to the L-valve, the functionality of the DDP can effectively be shut off so the inventive system can be operated as a conventional crossover to a first stage centrifugal cyclone.

Additional modifications were also made to the vortex finder in the first-stage cyclone after the initial comparative control tests. The first modification was to change the diameter of the vortex finder from 3 inches to 2 inches in order to increase the annular gap between the cyclone barrel and the vortex finder to evaluate its effect on cyclone collection efficiency. The second modification was to remove the vortex finder completely and to evaluate the viability of simplifying the cyclone fabrication in this manner.

Figure 9:
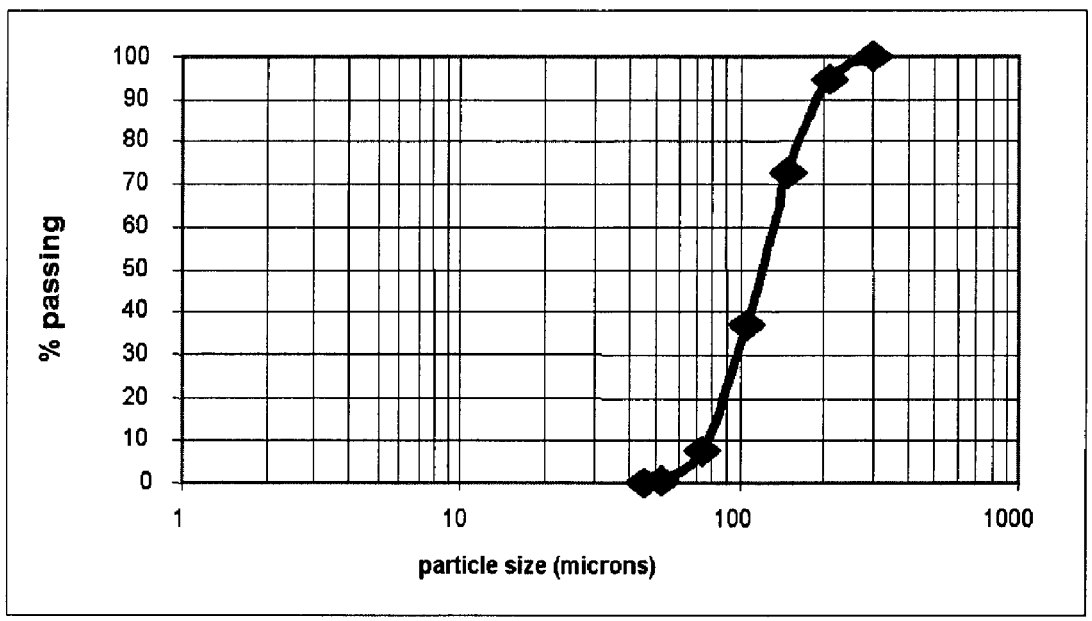
FIG. 9 is a graph illustration of a particle size distribution for an exemplary circulating bed material utilized in the appended Examples.
Figure 10:
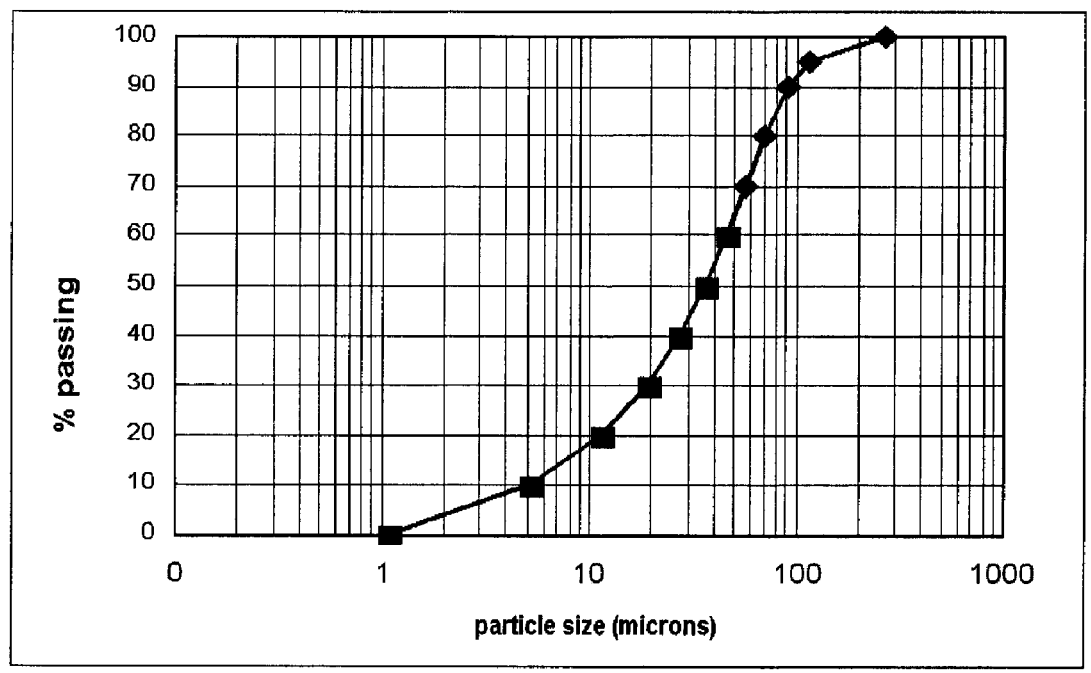
FIG. 10 is a graph illustration of a particle size distribution for an exemplary circulating bed material utilized in the appended Examples.
Figure 11:
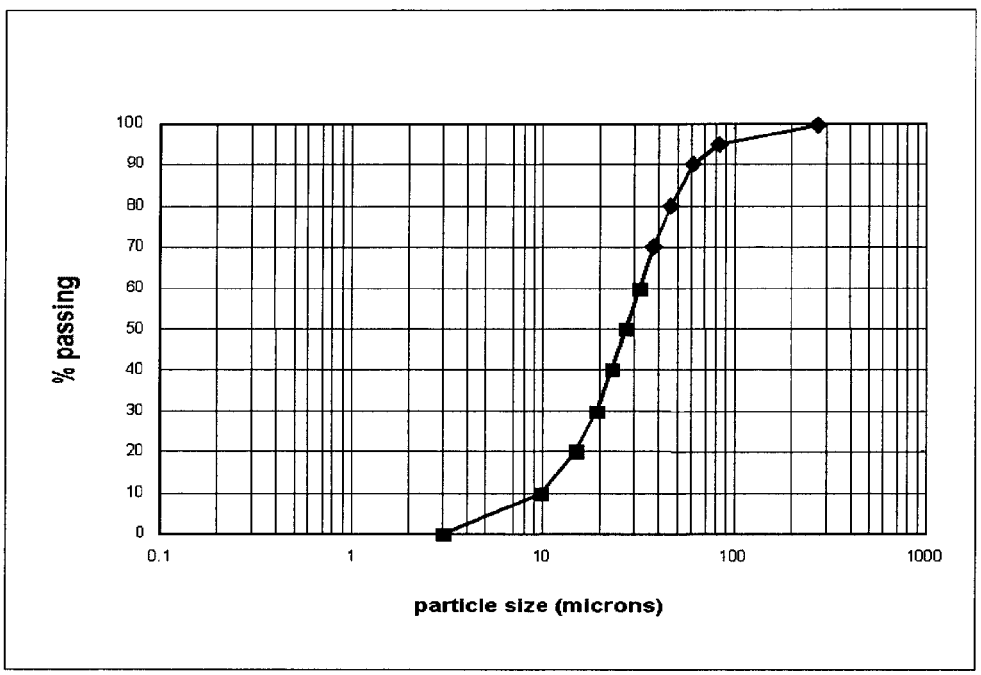
FIG. 11 is a graph illustration of a particle size distribution for an exemplary circulating bed material utilized in the appended Examples.
Figure 12:
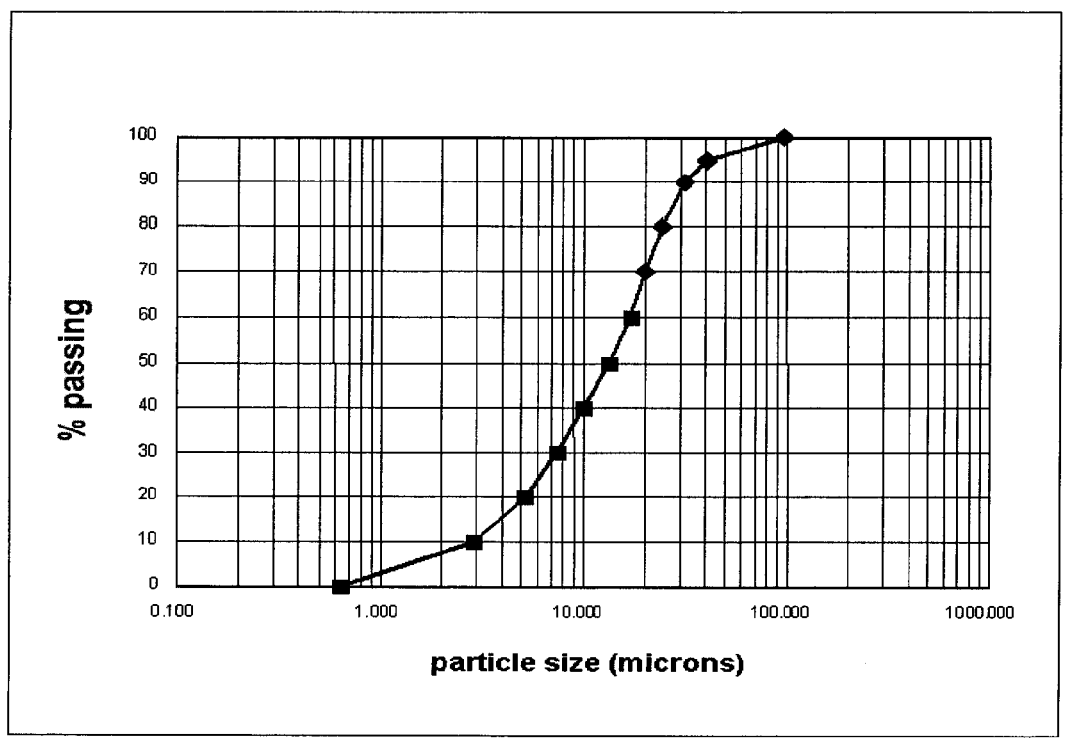
FIG. 12 is a graph illustration of a particle size distribution for an exemplary circulating bed material utilized in the appended Examples.

The circulating bed material was SW110 sand with a mass mean $d_{50}$ of 122 μm and the particle size distribution (PSD) as reported in FIG. 9. Silica-flour, a filter aid called Cellite and the PCD char from TC06 were also added to make the bed material PSD wider and particle size smaller so that the exemplary cyclone efficiency measurement could be simplified. The PSD of theses test materials are reported in FIGS. 10, 11, and 12.

A series of tests were performed under the specific test conditions given in Table I. The objectives for these tests were to evaluate the influence of vortex finder, entrance gas velocity, different materials injected and particle sizes on the performance of the inventive high solid loading cyclone system. In Table I column 5, under the title "Desaltation" contains three terms: "NO", "ON", and "OFF". The term "NO" indicates that the DDP was not installed during these control tests. The desaltation "ON" means that the DDP was installed and that aeration to the drain pipe was flowing and saltation in the cyclone inlet was eliminated. The "Off" designates that the DDP was installed and that aeration was shut off, the drain pipe was fully packed with solids, and the cyclone inlet generally had solids saltation during these tests.

TABLE I

| Example # | Material in Bed | Additive | Injection Amount (lbs) | Desaltation | Vortex Finder | 1st Cyclone Inlet Velocity (ft/s) | DP Riser (in-H₂O) |
|---|---|---|---|---|---|---|---|
| 1 | Sand | — | — | NO | 3"/yes | 60 | — |
| 2 | Mixture | Silica Flour | 50 | NO | 3"/yes | 60 | 60 |
| 3 | Mixture | Silica Flour | 40 | NO | 3"/yes | 60 | 60-90 |
| 4 | Sand | Silica Flour | 31.3 | On | 2"/yes | 60 | 42-54 |
| 5 | Mixture | — | — | On | 2"/yes | 60 | 43 |
| 6 | Mixture | — | — | On | 2"/yes | 60 | 50 |
| 7 | Mixture | — | — | On | 2"/yes | 60 | 50 |
| 8 | Mixture | — | — | On | 2"/yes | 60 | 45 |
| 9 | Mixture | — | — | On | 2"/yes | 60 | — |
| 10 | Mixture | — | — | On | 2"/yes | 60 | 45-60 |
| 11 | Mixture | Cellite | 16.06 | On | 2"/yes | 60 | 40-70 |
| 12 | Mixture | Char | 10.13 | On | 2"/yes | 60 | 70 |
| 13 | Mixture | — | — | On | 2"/yes | 60 | 70 |
| 14 | Sand | Cellite | 18.44 | On | 2"/yes | 60 | 40 |
| 15 | Mixture | Cellite | 5.58 | Off | 2"/yes | 60 | 40 |
| 16 | Mixture | Cellite | 5.78 | On | 2"/yes | 60 | — |
| 17 | Mixture | Char | 10.68 | Off | 2"/yes | 60 | 45 |
| 18 | Mixture | Char | 10 | On | 2"/yes | 60 | 40-50 |
| 19 | Fresh Sand | Cellite | 6.6 | Off | NO | 60 | 30-35 |
| 20 | Mixture | Cellite | 6.6 | On | NO | 60 | 40-50 |
| 21 | Mixture | Char | 9.88 | On | NO | 60 | 42 |
| 22 | Mixture | Char | 10.51 | Off | NO | 60 | 35-45 |
| 23 | Fresh Sand | Celite | 6.74 | On | NO | 100 | 35-42 |
| 24 | Mixture | Celite | 6.7 | Off | NO | 100 | 25-30 |
| 25 | Mixture | Char | 12.16 | On | NO | 100 | 60-80 |
| 26 | Mixture | Char | 10.24 | Off | NO | 100 | 37-42 |

Initially, the test apparatus was loaded manually with sand. A fines feeder was then extemporized from an existing 4" pipe to feed the fines while the cold flow model was running. The feeder was based on principles of fluidized bed operations. For a normal start-up, aeration gas starts first to fluidize the solids in the riser. Then conveying air was added to the riser to start solids circulation. This precaution was used because if the conveying air is introduced to the riser suddenly, the entire content of the solids in the riser can form a plug as long as 2 ft, which can travel in so high a velocity (due to pressure building up in the bottom of the plug and poor permeability of the plug) that the momentum of the plug can break the pipe connections in the riser.

The overall solid circulation rate was measured by following one or a group of tracer particles, such as coke breeze in sand, flowing downward along the standpipe wall. Because solids flow in the standpipe is not completely fluidized and sometimes occurred in a less fluid jerky manner caused by the transition from the 12" standpipe to a roughly 2-foot-long 4" ID connection pipe in the bottom of the standpipe, a series of ten measurements were taken to calculate the average solids circulating rates. Further, it should be understood that because particles generally moved slower along the wall than in the center of the pipe, the measured solids circulation rate are likely lower than the actual circulation rates that occurred.

To measure the powder flow rate through the cyclone dipleg and calculate the first-stage cyclone collection efficiency, aeration to the loop-seal was turned off and the powder was accumulated in the dipleg. The accumulation rate was then calculated for a typical period of about 10 to 15 minutes for a total test period over 4 to 8 hours. Since the solids circulation rate was about 50,000 lbs/hr, for an observed efficiency gain (loss) of 0.001% the changes in the solids accumulation rate will be about 0.5 lbs/hr. For a bulk density of about 20 lb/ft³ in the dipleg, the height change of accumulated solids in the 4"-ID dipleg will be more than 3"/hr. Therefore, the uncertainty in collection efficiency calculation should be less than 0.001% from the reading of the dipleg accumulation. However, because the measurement in solids circulation rates is biased to the lower rate, the overall collection efficiency should again be higher than reported here.

The fines passing through the second-stage cyclone were collected in three bag filters. The weight of the bags was weighed before and after the test. The weight changes of the bags were also monitored during the run.

At the end of each run, solids samples were taken for particle size distribution (PSD) analysis. The standpipe sample was taken from the riser by sudden shutting off the conveying air so that some solids will accumulate in the bottom of the riser. The dipleg sample was taken from a sample port in the middle of the dipleg. The bag-filter sample was from the collection in the bag. Since some finer particles have tendency to stick to the wall, the bag-filter samples may also be biased to a slightly larger size.

II. Visual Observations and Discussion

In the control experiments operated without the DDP, incoming gas-solids were visibly split into two distinctive streams within a distance of about 5-6" upon entering the first-stage cyclone. In one stream, a relatively high velocity gas carried some solids occupying the top portion of the cyclone inlet. This stream flowed in the same manner as gas-solids mixture in a conventional cyclone. The entrained solids, referred to herein as a fast moving stream or a 100 g stream traveling roughly the same velocity as the carrying gas, were immediately pushed to the cyclone wall by gravity force. To this end, the number of gravity force on a particle is calculated as:

$$\text{No. of } g = \frac{U_i^2}{wg};$$

where $U_i$ is the inlet velocity and w is the width of the cyclone inlet.

The majority of the entrained solids ran a whole turn around the barrel of the cyclone and returned to the entrance thereby joining with fresh incoming solids. A small fraction of the solids, when encountering the fresh incoming gas-solids mixture, followed a straight path to the center and hit the vortex finder. Although it is difficult to observe the flow paths of these particles after hitting the vortex finder, it is reasonable to assume that some of them would slide along the surface of the vortex finder and become entrained with the exiting gas. It is also observed that when solids are pushed to the cyclone inlet from crossover, a pulse of entrained solids was also discharged through the cyclone outlet.

The second observed stream of solids visibly entered the cyclone from the bottom of the crossover pipe due to saltation. This stream of solids, called a slow moving stream or 1 g stream, received little influence from the centrifugal force of the carrying gas because the solids were not carried to the cyclone by the gas. As a result, these particles moved toward the cyclone inlet in a pulsating manner, likely due to the amount of solids accumulating in the crossover and due to the change in the shear stress of gas phase on the top layer of the accumulated solids. These solids directly tumbled into the cyclone at the entrance and would have fallen downward along the wall on the cyclone inlet side but for observed interference with the 100 g stream. To this end, the 100 g-stream after making one round around the cyclone barrel interfered with the 1 g stream and prevented a portion of those solids from directly falling along the entrance side wall. As a result, the 1 g stream together with a portion of 100 g stream formed new strands flowing in helical angles of about 60-70°.

The flow patterns of these two streams can be further described as follows: when the 100 g stream makes a turn in the vena contracta region, in which the majority of the particles are pushed toward the cyclone wall and to be collected by the cyclone, and returns to the inlet region and meets the fresh incoming 1 g stream. Both streams change momentum. The 1 g stream increases its momentum and 100 g stream decreases its momentum. For the first quarter of a turn, the majority of two streams actually flow together about 5-6" along the wall before roughly 80-90% of solids drops out of the gas stream and the two streams again become distinct.

Because of interference between the 100 g and 1 g streams, it can be observed that periodically solids were escaping from the first-stage cyclone. Further, some of these particles had an approximate size equal to the top size of the circulating bed materials. Thus, these larger particles escaping from the first-stage cyclone were collected in the secondary cyclone. The top size of particles escaping the second-stage cyclone is about 20 μm with a mass mean less 2-5 μm. The rate of solids exiting the second-stage cyclone was continuous and at a relatively low rate.

Generally, a high solid loading is the primary cause of saltation in the crossover. To this end, the highest solids loading that can conventionally be achieved without significant saltation is typically 30 (lb solids/lb gas) at a gas velocity of about 70 ft/s. While solid loadings as high as 70 lb. solids/lb gas can be needed in a CFB, the corresponding gas velocity needed to eliminate solids saltation in the crossover was estimated to be above 140 ft/s. However, as the gas velocity is getting higher, wall erosion becomes a significant concern. Therefore, it is desired to prevent solids saltation without increasing the gas velocity beyond the normal operating range.

Based on the visual observations on flow pattern in the cyclone entrance during the control experiments, the elimination of saltation becomes significant to both improving the cyclone collection efficiency and reducing erosion. To evaluate the significance, the inventive desaltation drain pipe (DDP) was installed in the exemplary cold flow model. The flow pattern in the drain pipe was generally a dense phase transport with many elongated irregular bubbles, generated from aeration gas in the 4-inch-diameter pipe. The amount of gas to the standpipe is roughly equal to that of gas entrained from solids plus added aeration gas as the bubbles.

The gas-solids mixture in the drain pipe flowed through the L-valve into the standpipe like a jet. The mixture flowed directly to the opposite wall though an 8-inch pipe. Once the particles hit the opposite wall, they were dispersed around the point of contact, much like a water fountain impinging on a wall. The carrying gas flowing to the standpipe and the jet action seemed to have no practical influence on the flow pattern within the cyclone.

The tee section was very effective in desaltation due to both gas flow direction change and the impacting on the wall. Specifically, because the inventive crossover comprised an inclined pipe, the solids flowed directly from the riser to the tee without saltation. Although the solids were still flowing along the bottom portion of pipe, they were moving continuously. Once reaching the tee, the majority of the solids tumbled into the drain pipe while the rest were carried by gas to the cyclone. As long as the drain pipe has the capacity to remove the separated solids, the gas stream going to the cyclone was at least substantially free of saltation.

When the DDP is in operation, the flow patterns in the cyclone entrance region are visibly different from the control tests conducted without the use of the desaltation drain pipe. As the gas carrying the reduced concentration of particles enters the cyclone, particles grouped into one or a few streaks or strands about ¼-½" wide. These strands contained approximately 90% or more of the entering particles and flowed into the cyclone entrance in a substantially horizontal pattern from at least the first ¼ to ⅓ of a turn around the cyclone barrel, depending on the solids loading and the carrying power of the gas. After this initial horizontal travel, the strands started to form downward spirals with a helical angle in the ranger of about 20-24°.

As long as these solids experienced little or no saltation in the cyclone entrance zone nor did the solids loading become very low (less than about 0.1 lb solids/lb gas) the helical angles formed by the particulate strands changed little with the solids loading and the entrance gas velocity, contrary to the conventional logic. Under conventional conditions, the angle is expected to decrease with a decrease in the gas velocity and/or an increase in the solids loading. However, in the observed flow patterns, the angle changed minimally if at all across a relatively wide range of gas velocity and solids loading conditions. The gas velocity and solids loadings did however result in changes in the number of the strands formed and strands oscillation along the wall in the vertical direction. For example, at the high gas velocity and low solids loading, fewer and narrower, possibly thinner, strands were formed and they also oscillated vertically. At lower velocity and higher loading, most of the solids formed a single strand flowing spirally downward with little oscillation. A few scattered particles were also observed spinning along the wall substantially horizontally. These particles after spinning approximately one turn returned to the entrance and joined fresh incoming particles entering into the strands.

Overall Collection Efficiency: The overall collection efficiency for the primary cyclone can be calculated as follows, $$\eta_t = 100\left(1 - \frac{F_1 + F_2}{F_c}\right) \quad (1)$$

In equation (1), $\eta_t$ symbolizes the overall collection efficiency; $F_c$, $F_1$ and $F_2$ are designated as the solids circulation rate, solids flow rate to the dipleg and to the bag filter, respectively.

Since the cyclone efficiency for these tests are generally greater than 99.9%, to distinguish the efficiency easier, a term called the number of separation stages, a term similar to number of mass transfer unit, can be defined as:

$$NSS = -\log\left(1 - \frac{\eta_t}{100}\right) \quad (2)$$

Note that in this definition the value of NSS is also equal to the number of nines in the percent of efficiency (e.g., for 99% of efficiency, NSS equals 2; for 99.9% efficiency, NSS is 3, etc.).

Grade Efficiency: The particle collection efficiency is defined as follows $$\eta_p = 100\frac{w_i}{F_c} \quad (3)$$

In equation (3), $\eta_p$ represents the particle collection efficiency and $w_i$ stands for the flow rate of collected particles with size less than a specified grade. In other words, the particle collection efficiency is a grade efficiency based on flow rate instead of the solid inventory in the system.

Table II provides the test results indicating the influence of entrance gas velocity on the overall first-stage cyclone collection efficiency. From the data in Table II, one can see that the collection efficiency is the same for the entrance gas velocities of 60 ft/s and 100 ft/s.

TABLE II

| Materials Injected | Velocity | Efficiency (%) | NSS (see. eq. (2)) | D50 (um) | Max Size (um) |
|---|---|---|---|---|---|
| Char | 60 | 99.984 | 3.785 | 8.32 | 57.06 |
| | 100 | 99.983 | 3.775 | 9.48 | 57.06 |
| Celite | 60 | 99.988 | 3.933 | 15.44 | 95.96 |
| | 100 | 99.984 | 3.791 | 11.31 | 67.86 |

Thus, in one exemplary aspect, it appears that the entrance gas velocity can reach a maximum point above which further increases in the velocity will not improve the collection efficiency. If the frictional force is neglected compared to the solids gravity force, the only forces on the mixture stream are the centrifugal forces mainly due to the gas velocity and gravity forces mainly exerting on solids. Then the force balance provides equation (4) below:

$$U_t = \sqrt{\frac{W_s g D}{2 W_g \tan\theta}} \quad (4)$$

In equation (4), D, g, $W_g$, $W_s$ and θ symbolize, in the given order, cyclone barrel diameter, gravitational acceleration, gas flow rate, solids flow rate and the solids downward flow helical angle. To use equation (4) for the prediction of the minimum cyclone entrance velocity one needs to know the downward spiral helical angle and solids loading ($W_s/W_g$) for a given cyclone barrel diameter.

Note that equation (4) is not a completely predicative model because the spiral angle can not be calculated from first principles, nor is it necessary for the angle to be constant. Furthermore, as has been mentioned before, the spiral angle also changes with the different turns spinning solids made in the cyclone. Nonetheless, if a characterized angle can be defined properly, equation (4) can be used to predict the minimum entrance velocity required for a range of solids loading.

Figure 13:
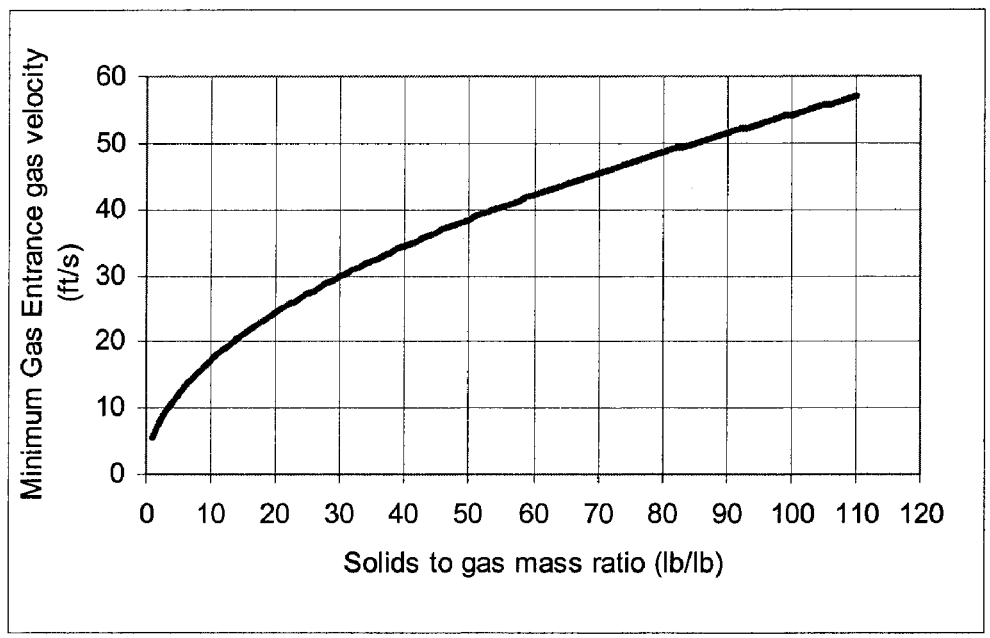
FIG. 13 is a graph illustration of exemplary gas velocities and solids loadings according to one aspect of the present invention.

FIG. 13 provide an exemplary calculation of variations of the minimum gas velocity with solids loading required to provide a spiral downward angle of approximately 20°. From this figure, one can see that for a solids loading of about 50 (lb solids/lb gas), the minimum entrance gas velocity required is less than 50 ft/s. At a solid loading of 10, the minimum gas velocity will be below 20 ft/s.

A further complementary set of experiments was performed to verify the existence of the minimum velocity. In these tests, Cellite was used as an additive and the injection rate was faster (2-3 lb/min) than in previous tests in order to give instantaneous high solids loading and to make efficiency measurement easier. Table III provides the test results, which indicate that within the tested range, the entrance velocity had little influence on the total solids collection efficiency. In particular, when one examines the normalized solids accumulation rate in the dipleg given in the last column in Table III, one can see that the normalized accumulation rates are the same for the tested gas entrance velocity of 37 and 60 ft/s. At the inlet velocities of 37 and 60 ft/s the system has better collection efficiency for fines. The cause for the cyclone being lower in the collection efficiency at 90 ft/s may have been due to re-entrainment, as will be discussed below in further detail.

TABLE III

| Riser velocity (ft/s) | Cyclone inlet Velocity (ft/s) | Solids Circulation Rate (lb/hr) | Cellite fed (lb) | Total Cellite Collected in 90 min. (%) | Normalized Solid Accumulation in Dipleg** |
|---|---|---|---|---|---|
| 18 | 37 | 31300 | 8.34 | 51.5 | 2.40 |
| 29 | 60 | 31300 | 7.6 | 57.9 | 2.32 |
| 44 | 92 | 31500 | 8.0 | 45.3 | 2.97 |

**The solid accumulation in the dipleg is normalized based on inches accumulated in the dipleg for each pound of Cellite fed during 90 minutes test period.

Figure 14:
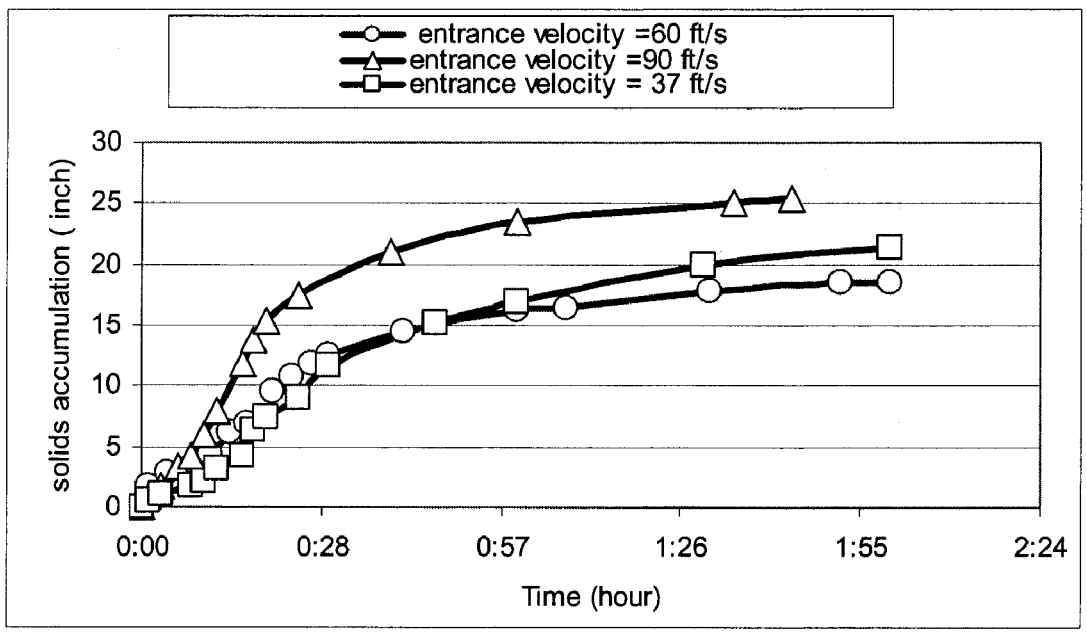
FIG. 14 is graph illustration of exemplary solids accumulation rates according to one aspect of the present invention.

The difference in fines collection efficiency can be further characterized by plotting the solids accumulation rate in the dipleg against time as shown in FIG. 14. From FIG. 14, one can see that during the initial test period in which Cellite was added, the solids accumulation rate was lowest at the gas entrance velocity of 37 ft/s and highest for the entrance velocity of 90 ft/s. In the later period of tests, the higher velocity seemed to favor the collection efficiency of larger particles. A plausible conclusion for this observation is that at high solids loading a lower gas velocity favors fine collection and a higher gas velocity gives high collection efficiency for coarser particles.

Figure 15:
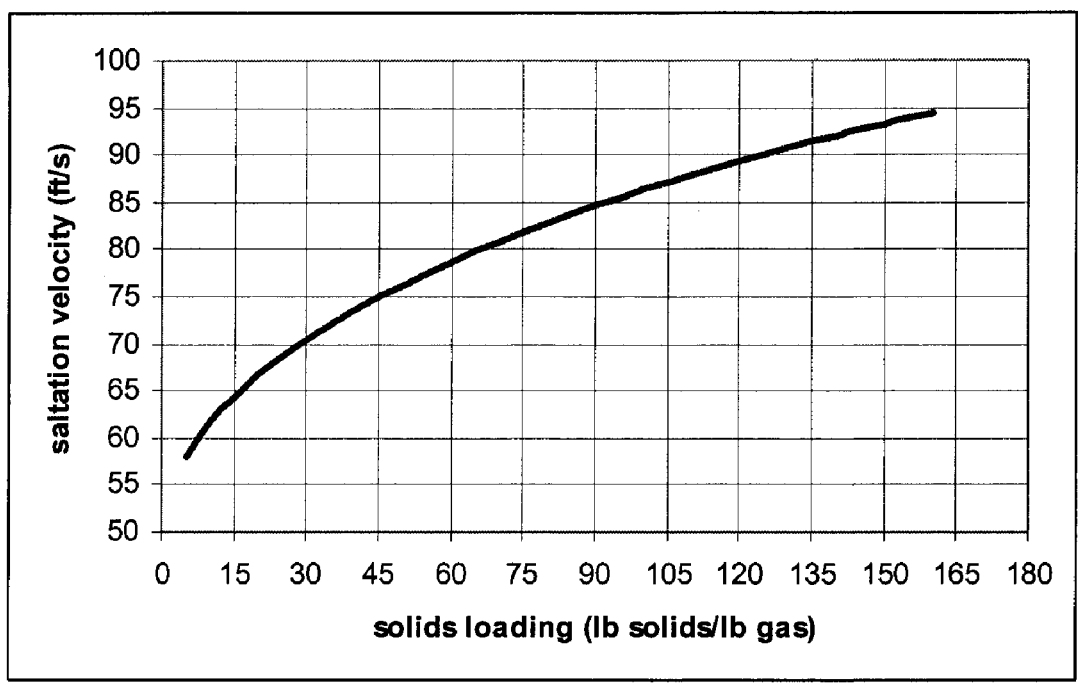
FIG. 15 is a graph illustration of the correlation between saltation velocity and solids loading according to one aspect of the present invention.

FIG. 15 provides some further examples of calculation results based on the described correlation. For the cold flow model, the solids loading at the cyclone inlet is about 30 (lb solids/lb gas) after desaltation. From FIG. 11, the calculated saltation velocity is 70 ft/s for a top size of 50 μm, while the observed solids collection efficiency decreased at 90 ft/s of the entrance velocity. This correlation again seems to provide a viable prediction. Since the larger particles have a higher saltation velocity and are harder to be reentrained, the high entrance velocity should have substantially no unfavorable influence on collection efficiency for those larger particles. Moreover, a high gas velocity will exert a greater centrifugal force on larger particles. Thus, this reasoning can explain why the higher gas velocity favors collections of larger particles and lower gas velocity gives higher collection efficiency for smaller particles as shown in FIG. 14.

In one aspect, a function of the DDP is primarily for eliminating saltation from the stream entering the cyclone and thus reducing the loading to the primary cyclone by separating substantial amounts solids and directly sending the solids to the standpipe. As a result of substantially eliminating saltation, the performance of the first stage cyclone can be improved as shown in Table IV below:

TABLE IV

| Parameters | With DDP | Without DDP |
|---|---|---|
| Char Injection | | |
| Efficiency (%) | 99.984 | 99.980 |
| $D_{50}$ (μm) | 8.32 | 10.92 |
| $D_{max}$ (μm) | 57.06 | 67.66 |
| Cellite Injection | | |
| Efficiency (%) | 99.988 | 99.978 |
| $D_{50}$ (μm) | 15.44 | 27.15 |
| $D_{max}$ (μm) | 95.96 | 271.4 |

From the data provided in Table IV, one can see that the DDP improves the cyclone performance in all reported categories. Particularly, for the same char injection, with the DDP both $D_{50}$ and maximum $d_p$ or $D_{max}$ from the cyclone exit decrease compared to without the DDP.

In another aspect, the performance of the DDP can be evaluated to determine the solids conveying capacity for the drain pipe. To that end, exemplary capacity test results are listed in Table V. The results seem to indicate that the flux for the drain pipe remains almost constant for most of the tests with a value about 220 (lb/ft² s). However, under one test condition, the flux was as high as 350 lb/(ft² s).

TABLE V

| Riser Velocity ft/s | Total Circulation lb/h | Flow Rate in Drain Pipe lb/hr | Mass Flow Rate (lb/s) | Solids Flux (lb/s ft²) | Coefficient K in eq. 8 lb/(s in$^{2.5}$) |
|---|---|---|---|---|---|
| 27.2 | 52200 | 17600 | 4.89 | 224 | 0.86 |
| 29 | 35343 | 27500 | 7.64 | 350 | 1.35 |
| 29.6 | 63100 | 15900 | 4.42 | 202 | 0.78 |
| 38.4 | 58600 | 18800 | 5.22 | 239 | 0.92 |
| 49 | 31416 | 17500 | 4.86 | 223 | 0.86 |

Excluding the measured flow rate of 7.64 lb/s, the mass flow rate for the 2-inch ID drain pipe on average was 4.85 lb/s.

This average mass flow rate is very close to the mass flow rate that can be empirically calculated as follows:

$$W = 0.82 D_0^{2.76} \quad (5)$$

In the equation (5), W and $D_0$ stand for mass flow rate (lb/s) and discharge office (inches), respectively. Thus, the calculated mass flow rate for the 2" ID train pipe is 5.5 lb/s, quite close to those rates obtained in Table V.

Figure 16:
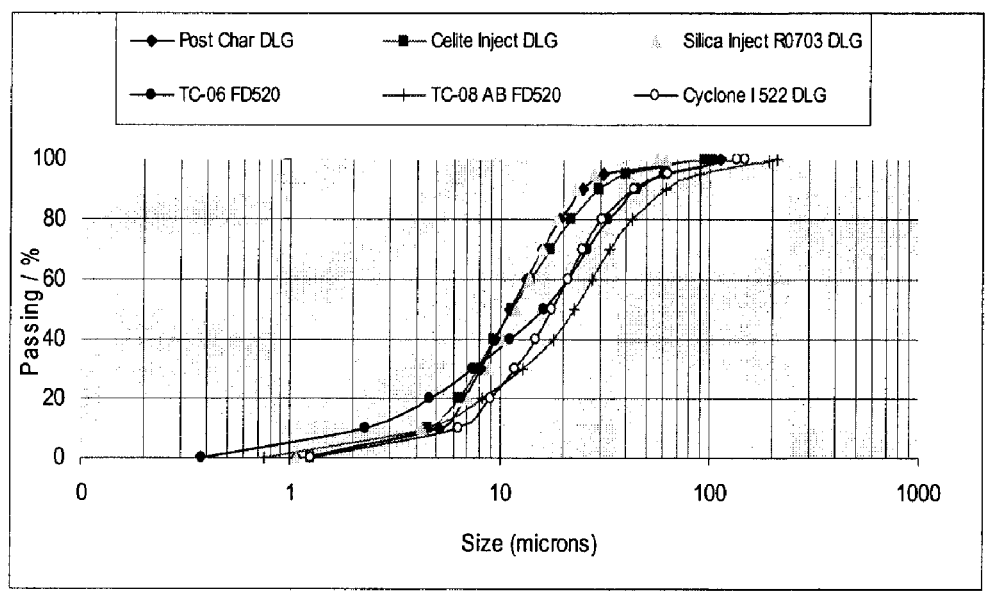
FIG. 16 is a graph illustration of particle size distributions for exemplary materials collected by a second stage cyclone according to one aspect of the present invention.

FIG. 16 plots the PSDs for the dipleg samples, which are materials that escaped the first-stage cyclone and were collected by the second-stage cyclone. Some typical PSDs from the PCD char are also shown in FIG. 16. A feature illustrated in FIG. 16 is that although the test conditions, properties of injected materials, and cyclone configurations are all different for the cyclones from which these samples were taken, the shape of the curves and mass mean diameter ($d_{50}$) are quite similar. Specifically, the PSDs from first-stage cyclone of the cold flow model are quite compatible to those of the PCD fines. It is also noticeable that the $d_{50}$ is reduced to 12 μm from 17 μm when the DDP is in operation.

Figure 17:
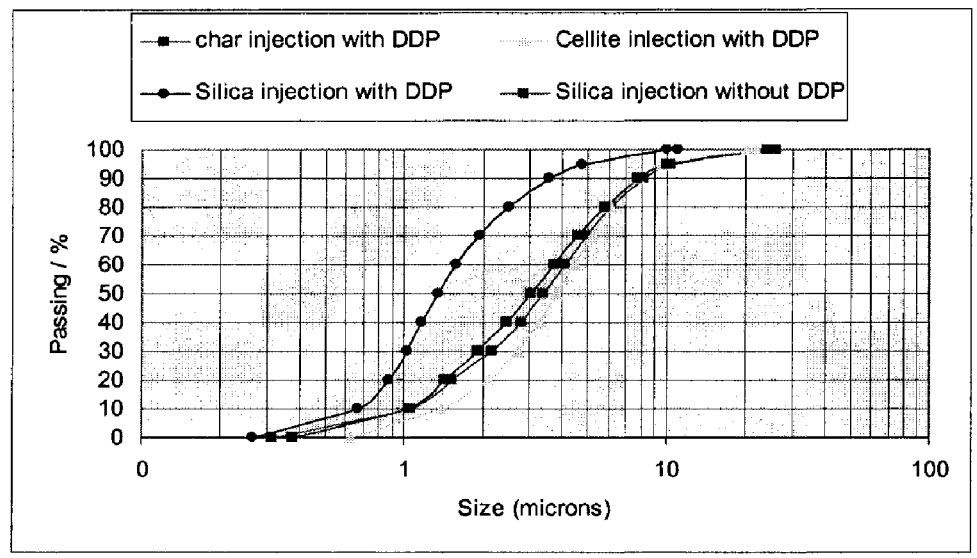
FIG. 17 is a graph illustration of the mass mean particle size for exemplary particles emitted by a second stage cyclone according to one aspect of the present invention.

FIG. 17 shows that for particles emitted from the second-stage cyclone, the mass mean particle size ($d_{50}$, 50% passing) is about 1.5 μm for silica flour and 3 μm for Cellite and PCD char. The measured $d_{50}$ is well comparable to the predicted value by traditional cyclone design equation given in equation (8), which gives a value of $d_{50}$ of 1.9 μm for silica flour and 2.0 for Cellite and char.

$$d_{p50} = \sqrt{\frac{9\,\mu b}{2\pi N_s V_i (\rho_p - \rho_g)}} \quad (8)$$

In equation (8), $d_{p50}$, $\mu$, $b$, $N_s$, $V_i$, $\rho_p$, $\rho_g$ stands for, in the given order, the mass mean particle diameter, gas viscosity, cyclone inlet width, number of turns made by solids, inlet gas velocity, solids particle true density and gas density, respectively.

The functionality of the vortex finder in a cyclone is to provide an initial downward velocity component for the particles to render them flowing out of the cyclone barrel section or to shorten the residence time of the collected particles. To this end, some tests were also performed to identify the role of the vortex finder on the collection efficiency of the inventive system.

The test results for the vortex finder effect are given in Table VI. These data seem to indicate that without a vortex finder the cyclone has equal or better collection efficiency compared to with the vortex finder. Table VI also shows that smaller exit pipe diameter gives better collection efficiency.

TABLE VI

| | | Cyclone | | |
|---|---|---|---|---|
| | | I | II | III |
| | | | Vortex | |
| Injection | | 3' ID and 4" inside | 2" ID and 10" inside | 2" ID and 0.2" inside |
| Char | Efficiency | | 99.9836 | 99.9860 |
| | NSS | | 3.79 | 3.85 |
| | $d_{50}$ | | 8.32 | 8.08 |
| Cellite | Efficiency | | 99.9875 | 99.9883 |
| | NSS | | 3.90 | 3.93 |
| | $d_{50}$ | | 17.33 | 15.44 |
| Silica | Efficiency | 99.9435 | 99.9728 | |
| | NSS | 3.25 | 3.57 | |
| | $d_{50}$ | 16.27 | 11.50 | |

Figure 18:
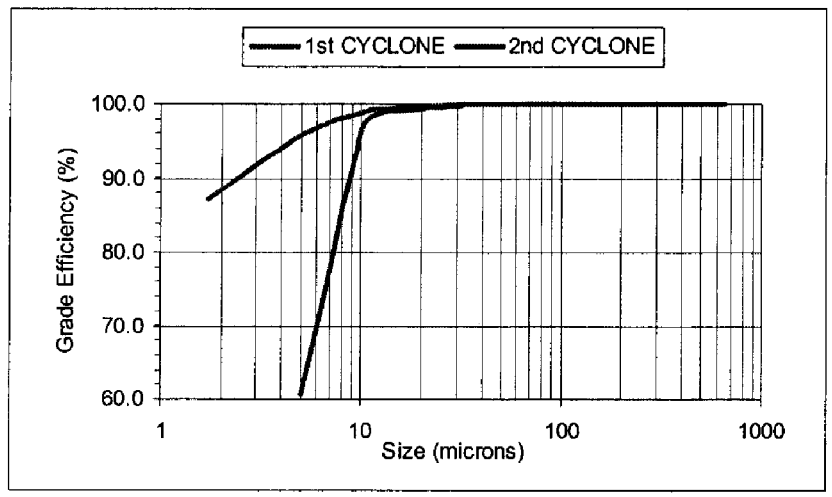
FIG. 18 is a graph illustration of exemplary grade efficiencies for char injection tests according to the present invention.
Figure 19:
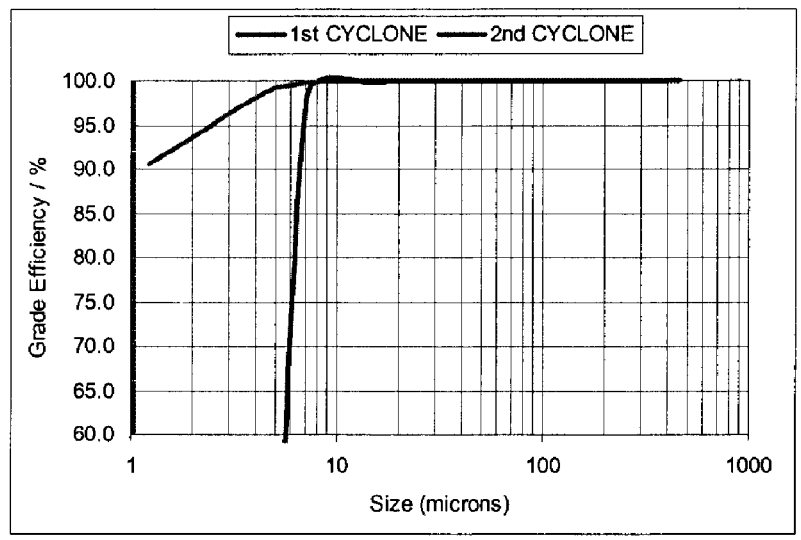
FIG. 19 is a graph illustration of exemplary grade efficiencies for char silica flour injection tests according to the present invention.
Figure 20:
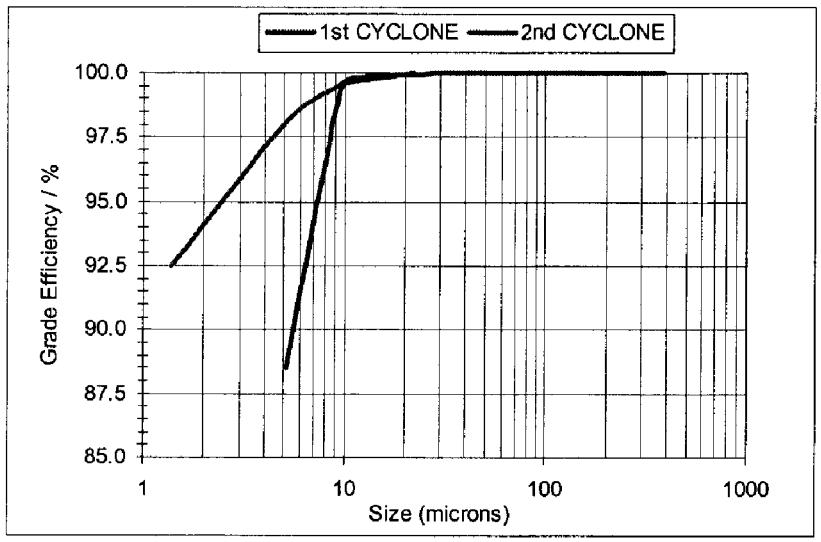
FIG. 20 is a graph illustration of exemplary grade efficiencies for cellite injection tests according to the present invention.

FIG. 18 gives the grade efficiency for char injection tests. FIG. 18 indicates that the primary cyclone has collection efficiency about 97% for 10 micron particles. The combined cyclones have collection efficiency of 100% for particles size greater than 34 μm. FIG. 19 gives the grade efficiency for silica flour injection tests. The first-stage cyclone has a collection efficiency of 99.8% for particle size of 15 μm. The combined cyclones have collected all particles greater than 16 μm. FIG. 20 presents the grade efficiency for Cellite injection tests. The first-stage cyclone has a collection efficiency of 99.3% for 9.5 μm particle diameter. The combined cyclones have collect efficiency of 100% for particles greater than 22 μm.

What is claimed is:

1. A method for recirculating solids in a circulating bed reactor, comprising:
   providing a particulate laden gas-solids stream in a line downstream from a circulating bed reactor and upstream from a desaltation device, wherein the particulate laden gas-solids stream has an average flow velocity in the range of from approximately 25 to 75 feet/second, and wherein the particulate laden gas-solids stream has a solids loading in gas in the range of 2 to 20 pounds of particulate material per cubic feet of gas;
   introducing the particulate laden gas-solids stream into the desaltation device wherein the particulate laden gas-solids stream is separated into a reduced particulate laden gas-solids stream and a first dense stream of solids;
   introducing the first dense stream of solids to a standpipe and introducing the reduced particulate laden gas-solids stream to a cyclone, wherein the reduced particulate laden gas-solids stream is separated into a substantially particulate free process gas and a second dense stream of solids; and
   introducing the substantially particulate free process gas to a vent line for down stream processing and introducing the second lean stream of solids directly into the standpipe.

2. The method of claim 1, wherein the desaltation device comprises a housing defining an upstream inlet having a first cross-sectional area and a downstream outlet having a second cross-sectional area, the second cross-sectional area being greater than the first cross-sectional area, the housing further defining a conduit between the upstream inlet and the downstream outlet, the conduit having a top surface portion, a bottom surface portion, and a horizontal axis, wherein, at least a portion of the bottom surface of the conduit tapers downwardly and away from the top surface portion such that when the particulate laden gas-solids stream is received by the upstream housing inlet the particulate laden gas-solids stream is directed through the conduit and subjected to a centripetal force within the conduit.

3. The method of claim 2, wherein the conduit top surface is non-planar and tapers arcuately upward and away from the horizontal axis.

4. The method of claim 2, wherein the bottom conduit surface is substantially planar and tapers downwardly and away from the horizontal axis at an angle great than the angle of repose of the solids within the first dense stream of solids.

5. The method of claim 4, wherein the bottom conduit surface is substantially planar and tapers downwardly and away from the horizontal axis at an angle in the range of from approximately 45 to approximately 60 degrees relative to the horizontal axis.

6. The method of claim 1, wherein the cyclone is a vertical cyclone.

7. The method of claim 6, wherein the cyclone is a centrifugal cyclone.

8. The method of claim 6, wherein the cyclone is the standpipe.

9. The method of claim 1, wherein the first dense stream of solids is collected in a substantially vertical particle receiving drain pipe prior to being delivered to the standpipe.

10. The method of claim 9, wherein the first dense stream of solids is delivered to the standpipe through an L valve and an inclined conduit.

11. The method of claim 10, wherein the L valve has a length to diameter ratio in the range 2 to 4.

12. The method of claim 9, wherein the solids collected in the substantially vertical particle receiving drain pipe are fluidized by introducing a flow of inert gas into the drain pipe.

13. The method of claim 1, wherein the particulate laden gas-solids stream has an operating temperature in the range of from approximately 1000° F. to 2000° F.

14. The method of claim 1, wherein the solids entrained in the reduced particulate laden gas-solids stream have particle size in the range of 0 to 100 microns with mean size in 10 to 30 micron range and particle densities ranging from 80 to 160 lb/cu ft.

15. The method of claim 1, wherein the substantially particulate free process gas stream comprises entrained solids having an average mean particle no greater than approximately 10 microns.

16. A desaltation device for separating particulate material from a particulate laden gas-solids stream having a solids loading in gas greater than approximately 2 pounds of particulate material per cubic feet of gas, the desaltation device comprising:

an inclined cross over including an upstream receiving inlet, and a downstream outlet; and a desaltation vessel including a reduced particulate laded process stream discharge port, a solid stream discharge port, and a process stream receiving port in communication with the downstream outlet of the inclined cross over;

wherein, when a particulate laden gas-solids stream having a solids loading in gas greater than approximately 2 pounds of particulate material per cubic feet of gas is received by the upstream receiving inlet of the inclined cross over, the particulate laden gas-solids stream is separated into a reduced particulate laden process stream and a dense solid stream, as at least a portion of the solids in the particulate laden gas-solids stream is subjected to a centripetal force within the inclined cross over.

17. The desaltation device of claim 16, wherein the inclined cross over further comprises a bottom surface portion, the bottom surface portion substantially planar and tapering downwardly from the upstream receiving inlet to the downstream outlet, the bottom surface tapering downwardly and away from the horizontal axis at an angle in the range of from approximately 45 to approximately 60 degrees relative to the horizontal axis.

18. The desaltation device of claim 16, wherein the inclined cross over further comprises a top surface portion, the top surface portion being non-planar and tapering arcuately upward and away from the horizontal axis from the upstream receiving inlet to the downstream outlet.

19. A circulating fluidized bed reactor comprising the desaltation device of claim 16.

* * * * *